(12) United States Patent
Polen et al.

(10) Patent No.: US 12,411,815 B2
(45) Date of Patent: Sep. 9, 2025

(54) CENTRAL REPOSITORY SYSTEM WITH CUSTOMIZABLE SUBSET SCHEMA DESIGN AND SIMPLIFICATION LAYER

(71) Applicant: Allstate Insurance Company, Northbrook, IL (US)

(72) Inventors: Michael Polen, Tampa, FL (US); Zoran Navratil, Colorado Springs, CO (US); Maria Nina Abaya, Elkridge, MD (US)

(73) Assignee: Allstate Insurance Company, Northbrook, IL (US)

( * ) Notice: Subject to any disclaimer, the term of this patent is extended or adjusted under 35 U.S.C. 154(b) by 47 days.

(21) Appl. No.: 17/493,443

(22) Filed: Oct. 4, 2021

(65) Prior Publication Data

US 2023/0109718 A1    Apr. 13, 2023

(51) Int. Cl.
*G06F 16/21* (2019.01)
*G06Q 10/067* (2023.01)

(52) U.S. Cl.
CPC ......... *G06F 16/211* (2019.01); *G06Q 10/067* (2013.01)

(58) Field of Classification Search
CPC ............................ G06F 16/211; G06Q 10/067
See application file for complete search history.

(56) References Cited

U.S. PATENT DOCUMENTS

| | | |
|---|---|---|
| 5,523,942 A | 6/1996 | Tyler et al. |
| 5,970,490 A | 10/1999 | Morgenstern |
| 6,604,100 B1 | 8/2003 | Fernandez et al. |
| 6,687,873 B1 | 2/2004 | Ballantyne et al. |
| 7,089,583 B2 | 8/2006 | Mehra et al. |
| 7,284,196 B2 | 10/2007 | Skeen et al. |
| 7,395,255 B2 | 7/2008 | Li |
| 7,599,947 B1 | 10/2009 | Tolbert et al. |

(Continued)

FOREIGN PATENT DOCUMENTS

| | | |
|---|---|---|
| CN | 107610761 B | 6/2020 |
| WO | 2020139861 A1 | 7/2020 |

OTHER PUBLICATIONS

2015, March, Integration in an Insurance Distribution Platform, Paulo Gandra Sousa and Jorge Miranda, www.researchgate.net/publication/338966766.

(Continued)

*Primary Examiner* — William P Bartlett
(74) *Attorney, Agent, or Firm* — Dinsmore & Shohl LLP

(57) ABSTRACT

Methods and systems disclosed herein describe generating products using data objects and/or entities that comply with a canonical/governed model(s). The data objects and/or entities may be obtained from an enterprise model or a combination of an enterprise model and one or more local models within a central repository to generate the new product data structures. Once all the data objects and/or entities have been added to the new product, one or more simplification rules may be applied to the new product to flatten (optimize for consumption) the data structure of the product such that superfluous or extraneous code snippets may be removed, or reduced, in such a way that the product complies with the canonical model. The new product may then be exported to an executable data format, which can either be incorporated in another application or used as a standalone product.

31 Claims, 20 Drawing Sheets

(56) References Cited

U.S. PATENT DOCUMENTS

| | | |
|---|---|---|
| 7,991,802 B2 | 8/2011 | Chen et al. |
| 8,099,382 B2 | 1/2012 | Liu et al. |
| 8,121,976 B2 | 2/2012 | Kalia et al. |
| 8,166,450 B2 | 4/2012 | Fuhler et al. |
| 8,495,098 B1 | 7/2013 | Kern et al. |
| 8,701,128 B2 | 4/2014 | Salt et al. |
| 8,744,879 B2 | 6/2014 | Bodansky et al. |
| 8,832,130 B2 | 9/2014 | Doddavula et al. |
| 8,850,057 B2 | 9/2014 | Natoli et al. |
| 8,886,591 B2 | 11/2014 | McDonald et al. |
| 9,135,226 B2 | 9/2015 | Sulistio et al. |
| 9,262,451 B1 * | 2/2016 | Singh ................. G06F 16/215 |
| 9,411,864 B2 | 8/2016 | Glider et al. |
| 9,417,890 B2 | 8/2016 | Reddish et al. |
| 9,418,127 B2 | 8/2016 | Xiong |
| 9,762,435 B2 | 9/2017 | Shelton et al. |
| 10,303,753 B2 | 5/2019 | Greenblatt et al. |
| 10,419,586 B2 | 9/2019 | Ritter et al. |
| 10,430,164 B2 | 10/2019 | Goja et al. |
| 10,553,307 B2 | 2/2020 | Connely, IV et al. |
| 10,565,750 B2 | 2/2020 | Puri et al. |
| 11,343,142 B1 * | 5/2022 | Wang ................. H04L 41/0813 |
| 2004/0193455 A1 | 9/2004 | Kellington |
| 2004/0199905 A1 * | 10/2004 | Fagin ................. G06F 40/154 |
| | | 717/136 |
| 2005/0086587 A1 | 4/2005 | Balz |
| 2006/0085370 A1 | 4/2006 | Groat et al. |
| 2006/0155529 A1 | 7/2006 | Ludviksson et al. |
| 2006/0184410 A1 | 8/2006 | Ramamurthy et al. |
| 2006/0236307 A1 | 10/2006 | Debruin et al. |
| 2007/0005658 A1 * | 1/2007 | Myllymaki ........... G06F 16/258 |
| 2007/0214020 A1 | 9/2007 | Srinivasan et al. |
| 2007/0300242 A1 * | 12/2007 | Boyd ................. G06F 9/541 |
| | | 719/330 |
| 2008/0091690 A1 | 4/2008 | Ellersick et al. |
| 2008/0222603 A1 | 9/2008 | Shaw et al. |
| 2011/0178906 A1 | 7/2011 | Joye et al. |
| 2013/0246480 A1 * | 9/2013 | Lemcke ................. G06Q 10/10 |
| | | 707/E17.012 |
| 2014/0279838 A1 * | 9/2014 | Tsirogiannis ......... G06F 16/235 |
| | | 707/603 |
| 2014/0304305 A1 * | 10/2014 | Hui ................. G06F 16/212 |
| | | 707/803 |
| 2015/0379442 A1 | 12/2015 | Samanthapudi et al. |
| 2016/0179982 A1 * | 6/2016 | Dietrich ................. G06F 16/25 |
| | | 707/798 |
| 2016/0285794 A1 | 9/2016 | Naidu |
| 2017/0243301 A1 | 8/2017 | Wang et al. |
| 2018/0150599 A1 | 5/2018 | Valdes et al. |
| 2018/0373579 A1 * | 12/2018 | Rathore ................. G06F 11/327 |
| 2019/0265971 A1 | 8/2019 | Behzadi et al. |
| 2020/0004575 A1 | 1/2020 | Bailey et al. |
| 2020/0012693 A1 | 1/2020 | Denninghoff |
| 2020/0026532 A1 | 1/2020 | Bill |
| 2020/0053020 A1 | 2/2020 | Shear et al. |
| 2020/0104938 A1 | 4/2020 | Gorojovsky et al. |
| 2020/0133955 A1 | 4/2020 | Padmanabhan et al. |
| 2020/0293712 A1 | 9/2020 | Potts et al. |
| 2022/0019640 A1 * | 1/2022 | Hermann ............... G06F 16/972 |
| 2022/0188630 A1 * | 6/2022 | Donatelli ................. G06F 18/29 |
| 2022/0237202 A1 * | 7/2022 | Orun ..................... G06F 16/254 |

OTHER PUBLICATIONS

Oct. 12, 2020, Canonical Data Modeling—A Quick Start-Up Primer, Tarun Gupta.

Mar. 15, 2010, From the Field: The First Annual Canonical Model Management Forum, Forrester.

International Preliminary Report on Patentability for Application No. PCT/US2022/077453 issued Apr. 9, 2024, 7 pages.

* cited by examiner

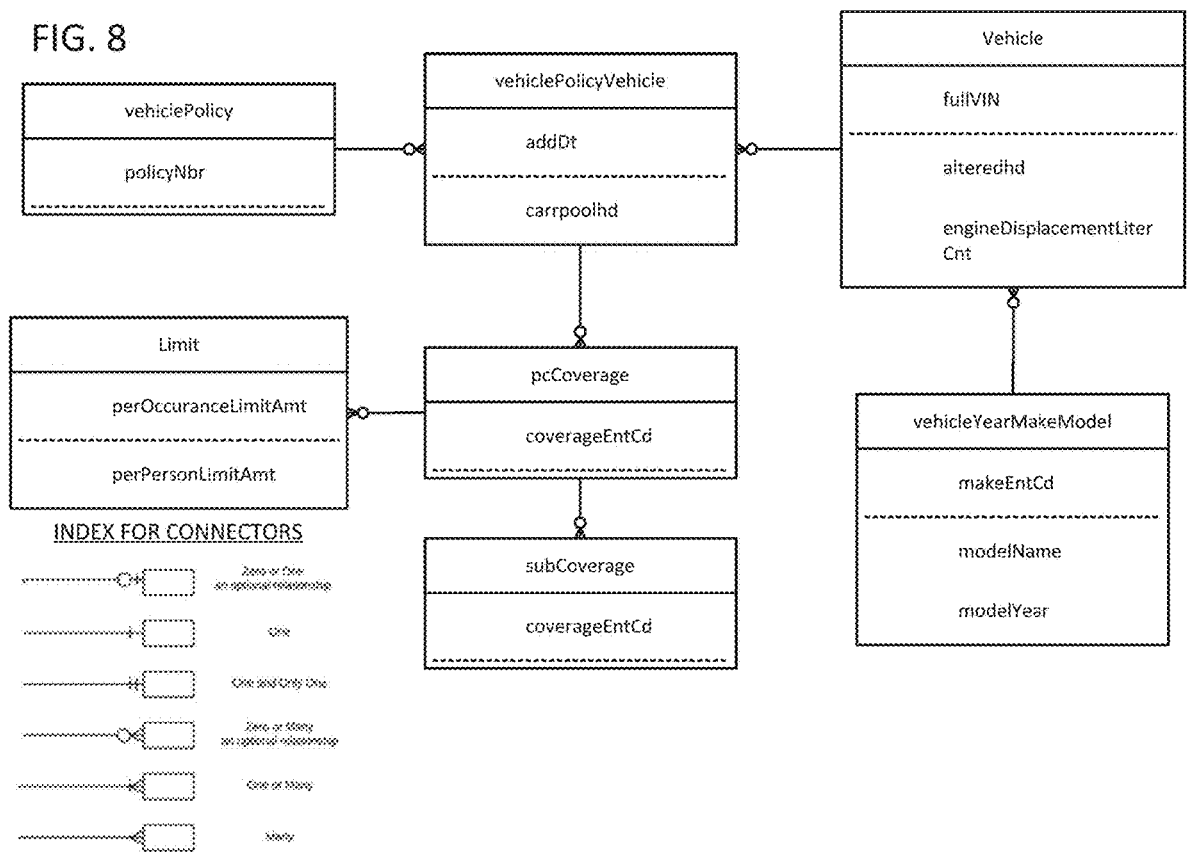

FIG. 9A

```
{
  "type": "object",
  "definitions": {
    "PCCoverageType": {
      "description": "Insurance Policy Coverage is an insurance coverage - defined by the related product and included in the related insurance policy agrmt - with selected deductibles, and selected imits or limits determined based on the value of a related asset.",
      "type": "object",
      "properties": {
        "coverageEntCd": {
          "description": "A code that identifies the category of circumstances under which the insurance contract will provide a benefit. CodeCategoryId-100389",
          "type": "string"
        },
        "limits": {
          "description": "The maximum dollar amount which will be paid to the insured or for the insured under a specific coverage for a policy. ",
          "type": "array",
          "$ref": "#/definitions/LimitType"
        }
      }
    },
    "VehiclePolicyType": {
      "description": "Contains the details on the policy for the insured vehicle.",
      "type": "object",
      "properties": {
        "policyNbr": {
          "description": "The unique number assigned to the policy, or submission, being referenced. If required for self-insurance, the self-insured license or contract number. ",
          "type": "string"
        }
```

FIG. 9B

```
            }
        },
        "LimitType": {
            "description": "The maximum dollar amount which will be paid to the insured or for the insured under a specific coverage for a policy. ",
            "type": "object",
            "properties": {
                "perOccurrenceLimitAmt": {
                    "type": "double"
                }
            }
        },
        "VehiclePolicyVehicleType": {
            "description": "A collection of data describing the vehicles insured on the policy.",
            "type": "object",
            "properties": {
                "addDt": {
                    "description": "The date the subject or item of interest is included in an insurance policy.",
                    "type": "date"
                },
                "pcCoverages": {
                    "description": "Insurance Policy Coverage is an insurance coverage - defined by the related product and included in the related insurance policy agrmt - with selected deductibles, and selected imits or limits determined based on the value of a related asset.",
                    "type": "array",
                    "$ref": "#/definitions/PCCoverageType"
                },
                "vehiclePolicy": {
                    "description": "Contains the details on the policy for the insured vehicle.",
                    "type": "VehiclePolicyType"
                }
            }
        },
```

FIG. 9C

```
"properties": {
    "alteredInd": {
        "description": "Denotes whether a vehicle has been modified from its original manufactured condition.",
        "type": "boolean"
    },
    "vehiclePolicyVehicles": {
        "description": "A collection of data describing the vehicles insured on the policy.",
        "type": "array",
        "$ref": "#/definitions/VehiclePolicyVehicleType"
    },
    "fullVIN": {
        "description": "The number assigned by the manufacturer or a state to identify the vehicle.",
        "type": "string"
    }
  }
}
```

FIG. 9D

```json
{
    "alteredInd": false,
    "fullVIN": "1FTFW1EF8EFA71429",
    "vehiclePolicyVehicles": [
        {
            "addDt": "1967-08-13",
            "pcCoverages": [
                {
                    "coverageEntCd": "0001",
                    "limits": [
                        {
                            "perOccurrenceLimitAmt": 200.00
                        }
                    ]
                },
                {
                    "coverageEntCd": "0002",
                    "limits": [
                        {
                            "perOccurrenceLimitAmt": 300.00
                        }
                    ]
                }
            ],
            "vehiclePolicy": {
                "policyNbr": "2345GB4453"
            }
        },
        {
            "addDt": "1967-08-13",
            "pcCoverages": [
                {
                    "coverageEntCd": "0001",
                    "limits": [
                        {
                            "perOccurrenceLimitAmt": 450.00
                        }
                    ]
                },
                {
                    "coverageEntCd": "0003",
                    "limits": [
                        {
                            "perOccurrenceLimitAmt": 230.00
                        }
                    ]
                }
            ],
            "vehiclePolicy": {
                "policyNbr": "33457844453"
            }
        }
    ]
}
```

CENTRAL REPOSITORY SYSTEM WITH CUSTOMIZABLE SUBSET SCHEMA DESIGN AND SIMPLIFICATION LAYER

FIELD OF USE

Aspects of the disclosure relate generally to product development and, more specifically, to an interface for developing products using standardized data objects from one or more governed models. Another aspect of the disclosure generally relates to the management of models, subset schemas, data transformation/exchange mappings and metadata that enable the development of products from the governed data objects.

BACKGROUND

Corporations and/or enterprises may have development teams to build one or more products, such as applications, application programming interfaces (API(s)), executables, and the like, for each of the development teams. Within this disclosure, the term development team, application team, application, local team, team, and system are used interchangeably. In some instances, these development teams may be siloed based on the business unit the development team supports. The corporations and/or enterprises may define a canonical model to define a schema, or common format, to ensure that products from different development teams can communicate with each other. To ensure this communication between development teams and/or applications, however, it is common for each development team to create (or participate in) transformational mappings of their data objects to the organization's canonical model so that all other applications can understand/read/receive their data. Sometimes, these transformational mappings may be created by an enterprise data group or another data-focused group, but regardless there is considerable effort and resources expended to create and/or maintain these transformational mappings. Regardless of approach, today's common approach to creating and maintaining transformational mappings from an application to the canonical model is error-prone and very complex/expensive to maintain and stay current with a changing/evolving canonical model. Some corporations and/or enterprises have defined repositories of data objects and/or entities that development teams can pull from. However, these data objects and/or entities may comprise artifacts (e.g., superfluous or extraneous code snippets) that are not necessary for the development team and/or do not support the development team's needs or preferences. These artifacts may cause the products to execute slowly or consume more processing resources. Additionally, traditional repositories representing structures of data objects are rigid. In this regard, a user is expected to consume and/or use the precise data objects with little-to-no customization managed in the repository. Furthermore, removing and/or changing the undesired data objects may change the data object and/or entity such that the data object and/or entity no longer complies with the canonical model. Accordingly, the data object and/or entity, and the product it is associated with, may no longer communicate with other products in the enterprise.

Aspects described herein may address these and other problems, and generally improve the efficiency and performance of product and application development.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Example methods and systems described herein disclose generating products (e.g., applications, executables, API(s), data structures, schemas, business rule models, relational data models, etc.) using data objects and/or entities that are defined within one or more canonical models managed by a central repository system. The term central and enterprise may be used interchangeably within this disclosure. The data objects and/or entities may be obtained from an enterprise canonical model and/or local (system/team) model(s). One or more rules may be applied to the product to flatten the data structure of the product such that superfluous or extraneous data definition snippets, including unwanted child entities, unwanted associative entities, and relationships between structured data objects, may be removed, or reduced (as applicable), in such a way that the product is transformable to the enterprise canonical model. This improves the speed and/or efficiency with which products are generated, consumed, developed, and executed, while ensuring that the products are able to communicate with other internal products and applications. By forward-engineering the data schemas/products used by applications utilizing the central repository system, the traditional need to develop and maintain transformational mappings through a manual, highly fragmented and/or distributed (and often unorganized) process is eliminated. Since the applications use schemas/products generated from the central repository system, there is no need or value in managing transformation mappings elsewhere. This results in much more accurate, efficient (automated) and trusted transformational mappings that require no manual maintenance or involvement. Additionally, since the application schemas are sourced and generated from the central repository system, there is no need for separately managed transformation data mappings.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 8 shows an example of an illustrative model in accordance with one or more aspects of the disclosure; and FIGS. 9A-9D shows an example of a JSON schema generated from a model in accordance with one or more aspects of the disclosure.

DETAILED DESCRIPTION

Figure 1A:
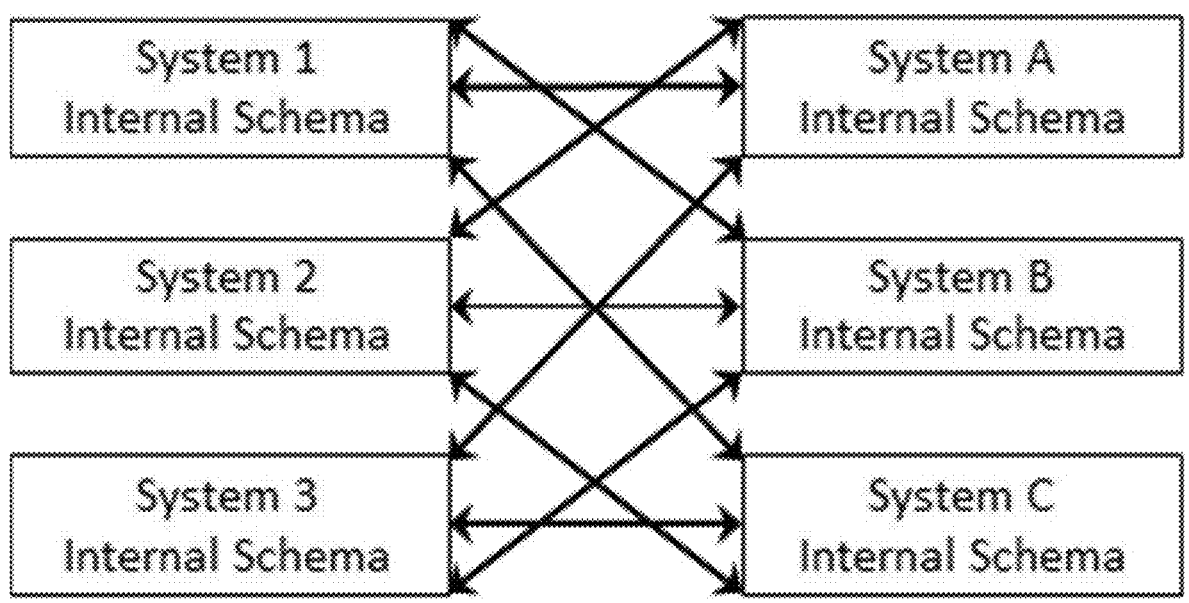
FIG. 1A shows an example of a prior art point-to-point approach to data object transformation mapping.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

More and more often, companies need to share data across their systems. The problem is how difficult sharing data is when each system has different data layouts and vocabularies, languages, requirements, syntax, and protocols. One solution to these problems could be the creation and utilization of one or more canonical data models (CDMs or CMs). The purpose of a CDM is to enable an enterprise to create a common definition of standardized data objects. Various systems within the enterprise can build and maintain transformation mappings of the data objects they use and store them with the CDM. The validated transformation logic may be stored within the CDM. When all (or many) systems participate in this process, data exchange between systems becomes more efficient, organized, and accurate. This leads to improved integration between systems, improved processes and practices, easier data analytics, and more manageable changes as the enterprise architecture changes (to reflect organization and business rule changes and needs). Standardizing data object definitions and establishing methods for building and maintaining transformation mappings from a system's data objects to a CDM/s data objects comes with a number of short-comings, such as significant complexity and cost, extensive human interaction and error, organization/tracking issues between versions of objects and logic, etc. Specific limitations of the conventional approach of using CDMs are related to the conventional use of shared structure definitions between systems as opposed to allowing systems to optimize their structures for individual integrations but still maintain the mapping to central Model(s) (hub) (shared structures). In the conventional Canonical Model approach, the CDM does not lend itself to being a hub that creates and manages the data structure transformation mappings to/from each participating System needing/wanting an optimized/simplified schema (conventionally this is performed by each System and defined/managed by humans) nor does it support the design (forward engineering) of the System(s) optimized/ simplified data structures to be governed and generated by the hub. Therefore, in the conventional approach, each System would build and manage customized data structure transformation mappings from its optimized schema to the hub (CDM).

By way of introduction, the present disclosure describes a central repository system that comprises one or more models and/or a plurality of subset schemas. The one or more models may be enterprise repository (e.g., central repository, hub repository, central model, or hub model) or local model (e.g., system model, team model). An "enterprise model" may be a collection of sharable data objects defined (standardized) to facilitate the representing, persisting, and/or exchanging of data for or between software systems within an organization. An enterprise model could be a canonical model with data objects consumable by a plurality of software systems and/or project teams. A "local model" may be a collection of data objects defined by a group of people (e.g. project team) within an organization comprising data objects where each data object is either (1) created to exclusively support schema designs owned by the group or (2) created as a drafted shareable data object that is intended to become a candidate for promotion/migration into the enterprise model. Either way, data objects residing in a local model may be owned by and/or be exclusive to the project team owning the local model until/unless a data object is promoted/migrated into the enterprise model. A local model could be a canonical model with data objects exclusively owned and consumed by the project team owning the local model. Each model of the one or more models may comprise a plurality of data objects. As used herein, a "data object" may be an object capable of storing or representing data or data properties. Examples of data objects may include an element, a complex type, a Dynamic Complex Type, a Role Name, a Group, a schema path, a domain, a Domain Collection, or a data relationship. A "complex type" is a reusable data structure template that is implemented as a structured element. A Complex Type can comprise a plurality of Elements (simple and/or structured). A Complex Type can be implemented by a plurality of Structured Elements, but cannot itself be directly implemented. When recording the design of Subset Schemas within the central repository system, the Complex Type assignments to Structured Elements within the Models (e.g., Enterprise and Local) are not carried into (persisted/stored within) the subset schema. Instead, the central repository system may generate a Complex Type dynamically for each selected Structured Element within a Subset Schema—this Subset Schema generated Complex Type is referred to as a "Dynamic Complex Type." The default Dynamic Complex Type name may be derived from the Structured Element Name (e.g. sensorDevice is assigned Dynamic Complex Type of SensorDeviceType). This default Dynamic Complex Type may be overridden by a user to prevent a Structured Element that exists more than once within a Subset Schema from being assigned a Complex Type that aggregates and combines all of the selected properties from across all instances of that Structured Element (within that Subset Schema). For example, by overriding the Dynamic Complex Type name, the central repository system may allow a Structured Element such as "party" to occur twice within the same Subset Schema where the first instance of "party" can include only the properties of "name" and "phoneNumber" and the second instance of "party" may include only the properties of "effectiveDate" and "expirationDate." Without the override capability, each "party" instance in this example would include "name," "phoneNumber," "expirationDate," and "expirationDate" resulting in significant dilution (noise) of concise data presentation and efficient data consumption. An "Element" is the basic building block of a Schema (e.g. JSON document). Each element may be a Simple Element or a Structured Element. A "Simple Element" may be used to store a fact within a Schema (e.g. firstName, operatingSystemCd). A Simple Element may be defined with an atomic/basic data type, such as integer, string, date, Boolean, etc. For example, an array may be a repeating/unbounded simple element. Each subset schema, of the plurality of subset schemas, may comprise one or more data objects from the one or more models. A "Structured Element" may be a data structure that is defined by the Complex Type it references (as opposed to being defined by a basic data type such as "string" used by a Simple Element). An example of a "Relationship" is a Structured Element included in a Complex Type Definition. The referenced Structured Element and the Complex Type represents a Relationship between the referenced Structured Element and any Structured Element(s) that implements the Complex Type. A "Group" is a reusable collection of Elements (simple and/or structured). Rather than reference every Element within a collection, a Structured Element can simply reference the collection (Group), instead. A "Schema Path" may be a concatenation of elements names (along with path symbols/notation) representing the navigational path from a root (first) Element to a child Element in a hierarchical structure.

Each Data Object defined in a Local Model does not exist as an Active Data Object in the Enterprise Model, and only members of a User Group that owns the Local Model can include Data Objects from the owned Local Model into a Subset Schema owned by the User Group. As used herein, an "Active Data Object" is a data object that is not retired or marked/scheduled for deprecation in the Enterprise Model. For example, a Custom Team Element may be a type of Data Object. A "Custom Team Element" is a Simple Element or a Structured Element that is defined within a Local Model (as opposed the Enterprise Model). Such an Element is referred to as a Custom Element or Custom Team Element due to it not being sharable across the Enterprise (isolated to one or more Local Models owned by a single User Group). The Custom Team Element may be owned and managed within one or more Local Models of a single User Group. The Custom Team Element may be included in a Subset Schema that is owned by the User Group that had it created in its Local Model(s). The Custom Team Element may group Data Objects from across any combination of one or more Local Models owned by the associated User Group and the Enterprise Model to facilitate efficient consumption. Conversely, each Data Object defined in the Enterprise Model may be defined and/or standardized from an enterprise's perspective, whereas the Local Model comprises data objects only needed to support data processing and consumption specific to the User Group that owns the Local Model. The central repository system may comprise a sanctioning and promotion process to move a Data Object out of a Local Model and into the Enterprise Model. Data Objects in the Enterprise Model may be available to all Subset Schemas and/or for all User Groups. Active Enterprise Data Objects are not allowed to exist in any Local Model.

A Subset Schema may comprise Data Objects from a plurality of models (e.g., Enterprise Model(s) and/or Local Model(s)). A data object in the Enterprise Model may not exist in any Local Model, and a Local Model may be owned by a single User Group, and a member of the single User Group may be able to use the central repository system to construct a Subset Schema that includes data objects from the Enterprise Model and data objects from one or more Local Models owned by the single User Group. Similarly, the Subset Schema may be owned by a single User Group. The central repository system may manage Data Object Mappings between the central repository system and each Subset Schema. The central repository system may also manage (Data Object) Content Synchronization Rule Types and Content Synchronization Rules between a First Subset Schema and a Second Subset Schema. A Content Synchronization Rule may be a rule that ensures the Elements comprising (the selected elements for inclusion of) two identified Subset Schemas conform to the data integrity requirements of a Content Synchronization Rule Type assigned to govern the Subset Schema Relationship between the two identified Subset Schemas. As contemplated herein, there are four Content Synchronization Rule Types: (1) Independent-Dependent Content Integrity, (2) Defined Overlap Integrity, (3) Semantic Twin Content Integrity and (4) Mutual Exclusiveness (Inverse Twin) Content Integrity. A Content Synchronization Rule Type may be applied between a pair of Subset Schemas. A Subset Schema may have a plurality of Content Synchronization Rule Type Relationships with a plurality of other Subset Schemas. A Content Synchronization Rule Type Relationship may refer to a Subset Schema that has the same Content Synchronization Rule Type, for example, (Independent-Dependent Content Integrity Rule for example) applied to a plurality of other Subset Schemas. Content Integrity refers to the underlying data rules being enforced by the various Content Synchronization Rule Types. There is a state of Content Integrity within the two Subset Schemas involved in a Content Synchronization Rule/Relationship, for example, when the Elements comprising each participating Subset Schema conform to the Element Inclusion rules inherent to the Content Synchronization Rule Type established between those two Subset Schemas. The central repository system may take into account the (related) network of Content Synchronization Rules applied to one or more Subset Schemas and prevent incompatible Content Synchronization Rule Types from being created between any two Subset Schemas. In some embodiments, the central repository system may generate Transformational Mappings between the central repository system and a Generated Subset Schema. The central repository system may also generate Transformational Mappings between any two Generated Subset Schemas with overlapping content.

In some embodiments, the central repository system may manage data quality rules through a governorship process. In this regard, each element in an Enterprise Model may be subject to a Governed State (e.g., Approved, Rejected, Pending). Additionally or alternatively, each element in an Enterprise Model may be in a single Sanctioned State (e.g., Enterprise Compliant or Non-Compliant). Users with governorship authority may assign a Governed State and/or Sanctioned State to an element within the Enterprise Model. In some examples, each element in the Enterprise Model may comprise an Element Definition State (e.g., New, Development or Production). Similarly, each Subset Schema may be assigned a Subset Implementation State (e.g., Development, Release Candidate or Production). An Element in the Enterprise Model may be programmatically assigned an Element Definition State of Production after a Subset Schema comprising the Element is promoted to a Subset Implementation State of Production. That is, any Element in the Enterprise Model that is included in a Subset Schema with a Subset Implementation State of Production is programmatically assigned an Element Definition State of Production. An Element with a state of Release Candidate or Production will have properties thereof locked from changing within the (ownership) Model(s) where a change would have a consumption/software impact, such as the element name, data type, and cardinality. An Element in the Enterprise Model with an Element Definition State of Production will programmatically have its Element Definition State changed to Development, for example, if all Subset Schemas with a Subset Implementation State of Production that comprise the Production Element are deleted and/or demoted out of its Production State. Subject to governship rules (e.g., ownership, consumption, history, etc.), a Subset Schema may include Enterprise Elements in an Enterprise Compliant Sanctioned State in combination with Enterprise Elements in an Enterprise Non-Compliant Sanctioned State. An Enterprise Element may be an Element that either exists within the Enterprise Model or exists within a Local Model with a designation as an Enterprise Element candidate. Governship approval may be required for a new Subset Schema to include an Enterprise Element in an Enterprise Non-Compliant State. The central repository system may identify compliant and/or non-compliant (e.g., retired, rejected pattern, etc.) Data Objects, Categorize Compliance Issues, Link a Non-Compliant Data Object to its Replacement Compliant Data Object when existing, and/or generate Compliance Reports for Subset Schemas.

According to some aspects of the disclosure, the central repository system is operable to apply one or more Simplification Rules to a Subset Schema. The central repository system may produce a Generated Subset Schema in an executable format, such as Avro schema definition, XML Schema Definition (XSD), JSON Schema Definition, Java Class Definition, .Net Class Definition, Data Definition Language (DDL), etc. The one or more Simplification Rules may comprise collapsing an Associative Element in the Generated Subset Schema. An "Associative Element" may be a Structured Element used to resolve a many-to-many data relationship between two other Structured Elements. When collapsing an Associative Element, from a hierarchical perspective, a First Structured Parent Element may have a 1:M (Many) Relationship to a downstream structured Associative Element (from a hierarchical perspective) and a Second structured Parent Element positioned downstream from the Associative Element may also have a 1:M Relationship to the Associative Element. A 1:M or "Many Relationship" may be a data relationship from a parent Structured Element to a Child Element (structured or simple), where the number of instances of the child is more than one (e.g. 1:M means the child element can have an unlimited number of instances, 1:5 means the child element has a Many relationship from the parent element, but limited to a maximum of 5 instances). To collapse the structured Associative Element, the Simple Elements (e.g., Properties) of the Associative Element may be moved to the Second Parent Element and the 1:M Relationship from the First Parent Element to the Associative Element may be transformed into a 1:M Relationship from the First Parent Element to the Second Parent Element. All remaining Relationships to and from the Associative Element may be moved to the Second Parent Element and the Associative Element is removed from the Generated Subset Schema. The Cardinality and Optionality of all moved relationships may remain unchanged from their Pre-Simplification State.

Another example of the one or more Simplification Rules may be to reduce cardinality between a First Structured Element and a Second Structured Element within a Generated Subset Schema. In this regard, a 1:M Relationship from the First Structured Element to the Second Structured Element may be converted into a 1:1 Relationship from the First Structured Element to the Second Structured Element. The Optionality of the converted Relationship may remain unchanged from its Pre-Simplification State. A "1:1 Relationship" may be a data relationship from a parent Structured Element to a Child Element (structured or simple) where the number of instances of the child is limited to one. In yet another example, the one or more Simplification Rules may collapse (remove from subset layout) a Structured Element with a 1:1 child relationship from a parent Structured Element within the Generated Subset Schema. In this regard, a First Structured Element (parent) may have a 1:1 Relationship to a downstream Second Structured Element (child). The Simple Elements (e.g., Properties) of the Second Structured Element may be moved to the First Structured Element and the 1:1 Relationship between the First Structured Element and the Second Structured Element may be removed. All remaining relationships to and from the Second Structured Element (child) may be moved to the First Structured Element (parent) and the Second Structured Element is removed (e.g., deleted) from the generated subset schema. The Cardinality and Optionality of all moved relationships may remain unchanged from their Pre-Simplification State.

In yet another example of the one or more of the Simplification Rules, a Parent Supertype Element or one or more Child Subtype Elements may be collapsed in a Generated Subset Schema. Simplifying Super/Subtype data objects enables modeling and/or communicating advanced (fourth normal form type) business rules within the Central Repository System. This functionality enables the modeling of data structures (and underlying business rules) consistent with fourth normal form (per relational data modeling) and enable the generation of subset schemas/products with flattened (simplified/collapsed) Super/Subtype data objects and properties. By implementing simplifications of super/subtype data objects within the Central Repository System, the internal data mappings and applied simplification logic needed to support data exchange between any two systems where a generated subset schema referencing (sourced from) an enterprise super type and/or subtype data object is involved may be achieved. Additionally, accurate visualization models (ERDs) may be generated from the Central Repository System using the stored metadata describing super/subtype objects and relationships. In the past, a SuperType entity was created as a BaseType (complex type) and the associated Subtype entities were created as ExtendedTypes (complex types) of this BaseType. A BaseType is a complex type from which another complex type(s) is derived; a derived complex type inherits the elements from its associated base type when present. An ExtendedType is a complex type that has been assigned a BaseType wherein an ExtendedType can be also used as a BaseType for another/different Extended Type. Only implementation Elements for the subtype ExtendedTypes were created due to XML inheritance principles. This old approach led to a number of constraints and issues, such as: repeating/redundant relationships to (and attributes within) subtype elements (often via Groups), the inability to implement the supertype because there was no element at this grain, the inability to only record relationships and some attributes at the grain representing the underlying business rule and the inability to generate a clean/accurate visualization model (ERD) from the Central Repository's Model(s)' representation of related Super/Subtype objects and relationships. All of these issues have been overcome using the Simplification techniques described herein.

BaseTypes for Supertype representation are no longer created under this new approach/configuration. Additionally, ExtendedTypes for Subtype representation are not created either. Instead, a standard ComplexType (data structure template) and corresponding structured elements (implementation) may be created for all data structures. As a result, super/subtype data objects may be created that follow the same principles as all structured data structures within the Central Repository Model(s), but with some additional metadata and an additional step to account for Subtype Groupings.

Because built-in XML inheritance is no longer relied upon, metadata may be used to identify if an object is participating in a Super/Subtype relationship and whether the object is the supertype or a subtype of the relationship. When a ComplexType representing a SuperType entity is created within a Central Repository Model, this ComplexType may be designated (in linked metadata) as having a "Structured Object Type"="Supertype" in the Central Repository System. Most other metadata needed to enable the features described will automatically be generated by the Central Repository System and, likely, exposed to users. Exceptions to the automatic generation of metadata will occur if/when a user creates a ComplexType representing a Subtype prior to creating the ComplexType representing its Supertype or outside of the context of its Supertype. In these cases, the user will need to set the (metadata linked to Subtype) "Structured Object Type"="Subtype" within the Central Repository System (via software interface) and link it to its Supertype (and possibly its Subtype Grouping) in a separate action within the Central Repository System.

A Supertype can have multiple Subtype Groupings and each Subtype Grouping can either be an Inclusive grouping of subtypes or an Exclusive grouping of subtypes. Within an Inclusive grouping of subtypes, a single instance of the parent supertype may also be represented in any number (zero or more) of subtypes within the Inclusive grouping of subtypes. Within an Exclusive grouping of subtypes, a single instance of the parent supertype may only be represented in zero or one subtype within the Exclusive grouping of subtypes. Therefore, the metadata may identify each Subtype Grouping as either "Inclusive" or "Exclusive." Additionally, the metadata may identify the Subtype Grouping each Subtype Grouping object belongs to. Globally unique Subtype Grouping names may be automatically generated by the Central Repository System at the time the link between a Supertype and the first Subtype of a new Subtype Grouping is established within CMT. Upon this link between a Supertype object and the underlying Subtype Grouping object being created (or referenced), the user can identify the Subtype Grouping as "Inclusive" or "Exclusive" using the "Subtype Grouping Type" metadata.

The payoff of this new approach all manifests within the Subset Schema design facility within the Central Repository System. The object tree within the Subset Schema design facility will cleanly show all of the Super/Subtype objects in a nested fashion representing all modeled grains and all properties (elements and attributes) for each grain. The objects needed for a subset schema may be selected and one or more simplification rules may be applied to the Super/Subtype objects.

Prior to simplification, the Parent Supertype Element may have one or more Child Subtype Elements. Prior to simplification and generation, the Subset Schema may comprise any number of the one or more Child Subtype Elements of the Parent Supertype Element within its selected scope. Prior to Simplification, each of the one or more Child Subtype Groupings may comprise one or more Child Subtype Elements representing a type or category of the Parent Supertype Element. Each Child Subtype Grouping may be designated as either an Inclusive or Exclusive Subtype Grouping. An Inclusive Subtype Grouping allows for an instance of the Parent Supertype Element to exist in 0 or Many of the Child Subtype Elements within the Inclusive Subtype Grouping. An Exclusive Subtype Grouping requires that an instance of the Parent Supertype Element can only exist in 0 or 1 of the Child Subtype Elements within the Exclusive Subtype Grouping. Prior to Simplification, the Parent Supertype Element may be the parent element to all Child Subtype Elements comprising a Child Subtype Grouping owned by the Parent SuperType Element. Prior to Simplification, each of the Child Subtype Elements must belong to exactly one Child Subtype Grouping. Prior to Simplification, each of the Child Subtype Elements has a 1:1 identifying relationship from the Parent Supertype Element. Prior to Simplification, the Parent Supertype Element and the Child Subtype Elements are structured elements. The one or more Simplification Rules may facilitate the Collapsing of a Parent Supertype Element into one or more of its Child Subtype Elements selected to Receive the Parent Supertype Element in a Generated Subset Schema. During this type of Simplification, the Simple Elements of the Parent Supertype Element are moved to each of the one or more Receiving Child Subtype Elements. The 1:1 identifying relationship from the Parent Supertype Element to each of the one or more Receiving Child Subtype Elements may be removed, and all remaining relationships to and from the Parent Supertype Element may be copied to the one or more Receiving Child Subtype Elements. If all the Child Subtype Elements within a Child Subtype Grouping within the scope of the Subset Schema have the Parent Supertype Element collapsed into them, the Child Subtype Grouping may be removed. If all of the Child Subtype Elements across all Child Subtype Groupings of the Parent Supertype Element within the scope of the Subset Schema have the Parent Supertype Element collapsed into them, the Parent Supertype Element and the relationships to/from it may be removed from the Generated Subset layout. The Cardinality and Optionality of all copied relationships remains unchanged from their Pre-Simplification State.

The one or more Simplification Rules may facilitate the Collapsing of one or more Child Subtype Elements selected for collapsing within the Subset Schema scope into the Parent Supertype Element in the Generated Subset Schema. During Simplification, the Simple Elements of the one or more Collapsed Child Subtype Elements may be moved to its Parent Supertype Element, the 1:1 identifying relationship from the Parent Supertype Element to each of the one or more Collapsed Subtype Elements may be removed, and all the Child Subtype Groupings owned by the one or more Collapsed Child Subtype Elements may be moved to, and owned by, the Parent Supertype Element. For each of the one or more Collapsed Child Subtype Elements that owns one or more Child Subtype Groupings and has one or more relationships with other Structured Elements, all existing relationships to/from the Collapsed Child Subtype Element may be copied to each of the Child Subtype Elements of the Collapsed Child Subtype Element and the original one or more relationships between the Collapsed Child Subtype Element and the other Structured Elements may be removed from the layout. For each of the one or more Collapsed Child Subtype Elements, if the Collapsed Child Subtype Element does not have any Subtype Groupings and the Collapsed Child Subtype Element has one or more relationships with one or more other Child Subtype Elements with the same Parent Supertype Element, the one or more relationships may be converted into a non-redundant recursive relationship on the Parent Supertype Element. Additionally or alternatively, the one or more relationships may be converted into an Associative Structured Element with two identifying relationships from the Parent Supertype Element. The one or more Collapsed Subtype Elements may be removed from the Child Subtype Grouping from which it belonged prior to Simplification. All the remaining, viable, and non-redundant relationships (i.e., after actions previously stipulated for this type of Simplification) to and from the one or more Collapsed Subtype Elements may be moved to the Parent Supertype Element and the one or more Collapsed Subtype Elements may be removed from the subset schema layout. If, after Simplification, any Subtype Groupings exist with no remaining Subtype Element members, these Subtype Groupings may be removed. The Cardinality and Optionality of all moved relationships remains unchanged from their Pre-Simplification State.

The one or more Simplification Rules may facilitate the Collapsing of a Repeating End Branch Element within the context of a Subset Schema Scope in a Generated Subset Schema. A Repeating End Branch Element is a Child Structured Element with a M:1 relationship to a Parent Structured Element prior to Simplification. A Simplification eligible Repeating End Branch Element does not have any relationships with any Structured Elements other than the Parent Structured Element after all other chosen Simplification has been applied to the subset schema, such as the Collapsing of Associative Elements, Reducing of Cardinality, the Collapsing of 1:1 Elements, and Super/Sub Type Simplification. If one or more Simple Elements within the Repeating End Branch Element is selected for inclusion within the Subset Schema Scope, a Repeating Data Array Element may be created within the Parent Structured Element for each of the one or more selected Simple Elements from the Collapsed Repeating End Branch Element. The Repeating End Branch Element and its relationship to the Parent Structured Element may be removed from the layout.

A Subset Schema may have a Content Synchronization Rule Type relationship with a plurality of other Subset Schemas that allows the central repository system to manage sophisticated, Multi-Leg Content Synchronization Rules. Multi-Leg Content Synchronization Rules refers to the central repository system's ability to manage a series or network of Content Synchronization Rules, whereby a specific Subset Schema can have a Content Synchronization Rule with a plurality of other Subset Schemas, which in turn, can have a Content Synchronization Rule with a plurality of other Subset Schemas. The central repository system may manage the Content Synchronization Rules, prevent incompatible Content Synchronization Rules from being defined, and enforce the combined Content Synchronization Rules associated with each Subset Schema. The central repository system may use the Data Object Mappings between a Model and Subset Schema Elements to manage a Content Synchronization Rule Type that governs Independent-Dependent (e.g., Supertype-Subtype) Content Integrity between an Independent Subset Schema and a Dependent Subset Schema. An Independent-Dependent Content Integrity Rule may be a data integrity rule that ensures every Enterprise Element within a Dependent Subset Schema exists within the corresponding Independent Subset Schema. If an Enterprise Element is added to a Dependent Subset Schema where that Enterprise Element does not exist in the corresponding Independent Subset Schema, the central repository system may programmatically add the Enterprise Element to the Independent Subset Schema prior to recording its existence in the Dependent Subset Schema to ensure every Enterprise Element within a Dependent Subset Schema exists within the corresponding Independent Subset Schema. Under this Rule, an Independent Subset Schema may have an Element added without any impact or reconciliation with the corresponding Dependent Subset Schema. As part of the Data Object Mappings, the central repository system may manage (e.g., record) internal data object mappings between a Subset Schema Element and its source Model Element (in either the Enterprise Model or a Local Model), including the full Subset Schema Path to the Subset Schema Element. For example, if a user selects an Enterprise Element for inclusion in a Dependent (e.g., Subtype) Subset Schema, the central repository system may select the same Enterprise Element for inclusion in the Independent Subset (e.g., Supertype Subset) Schema. An Independent Subset Schema may be a Subset Schema designated as having the independent role in an Independent-Dependent Content Rule. If a user selects an Enterprise Element for inclusion in the Independent Subset Schema, the central repository system may not automatically select the Enterprise Element for inclusion in the Dependent Subset Schema. A "Dependent Subset Schema" may be a Subset Schema designated as having the dependent role in an Independent-Dependent Content Rule. The Dependent Subset Schema contains a subset of the Enterprise Elements within its corresponding Independent Subset Schema. The central repository system may use the Data Object Mappings to manage a Content Synchronization Rule Type that Governs Content Overlap and Overlap Integrity between a First Overlapping Subset Schema and a Second Overlapping Subset Schema. A Defined Overlap Integrity Rule is a data integrity rule that defines the content overlap (the Elements that must exist in both Subset Schemas comprising the Rule) between two Subset Schemas. For instance, a user can identify the Elements within one Subset Schema participating in this Rule that must exist in the other participating Subset Schema and the central repository system will programmatically update the Element Selections and/or Subset Schema Structure of the other Subset Schema accordingly. Elements subject to content overlap management within a given Content Overlap Rule/Relationship may be designated within either Subset Schema or both. For example, if a user selects an Enterprise Element with a Dependent Element Tree for inclusion in the First Overlapping Subset Schema, whereby that same Enterprise Element already exists in the Second Overlapping Subset Schema, the Central Repository System may automate an Overlap Synchronization Process to ensure (inclusion) synchronization of the Dependent Element Tree for the Enterprise Element across the two Overlapping Subset Schemas.

In another embodiment, the central repository system may use the Data Object Mappings to manage a Content Synchronization Rule Type that ensures Schema Content Synchronization between a First Content Equivalent Subset Schema and a Second Content Equivalent Subset Schema. If a user selects, or de-selects, an Enterprise Element for inclusion in the First Content Equivalent Subset Schema, the central repository system may apply the same action to the same Enterprise Element in the Second Content Equivalent Subset Schema, and vice versa. This may ensure that the First Content Equivalent Subset Schema and the Second Content Equivalent Subset Schema are comprised of the same Enterprise Elements. The Schema Layout of Enterprise Elements within the First Content Equivalent Subset Schema may be different than the Schema Layout of Enterprise Elements in the Second Content Equivalent Subset Schema.

The central repository system may use the Data Object Mappings to manage a Content Synchronization Rule Type that prevents Schema Content Overlap between a First Mutually Exclusive Subset Schema and a Second Mutually Exclusive Subset Schema. For example, if a user selects an Enterprise Element for inclusion in the First Mutually Exclusive Subset Schema, whereby that same Enterprise Element exists in the Second Mutually Exclusive Subset Schema, the central repository system may de-select that Enterprise Element from the Second Mutually Exclusive Subset Schema, and vice versa. If a user de-selects an Enterprise Element for inclusion in the First Mutually Exclusive Subset Schema, the central repository system may interact with the user to determine if the de-selected Enterprise Element should be selected for inclusion in the Second Mutually Exclusive Subset Schema, and vice versa.

In some embodiments, the central repository system may be configured to use Transformational Mappings to Govern Layout Simplification Compatibility between a First Related Generated Subset Schema and a Second Related Generated Subset Schema. Additionally or alternatively, the central repository system may be configured to use Transformational Mappings to Govern Layout Simplification Compatibility for each Simplified Structured Business Element across all (or a defined group of) Generated Subset Schemas. The central repository system may create transformational mappings between any Subset Schema Element and the corresponding source Model Element (in either the Enterprise or a Local Model). This capability may be enabled by the System's Model-to-Subset Schema internal transformation mappings (from Model Element to Subset Schema Element) that are internally sourced/generated and preserved by the central repository system when each subset schema is designed and/or generated (including applied simplification). These transformation mappings may be a composite of literal internal mappings between data objects in the Enterprise Model and data objects in a Local Model along with the internal tracking of simplification rules selected and/or applied within the central repository system. Taken together, the transformation mappings can enable a full transformation from any subset schema (simplified or not) designed within or generated from the central repository system to the enterprise model. By extension of this pattern, Transformational Mappings from one Subset Schema Element-to-Model Element, along with the Transformational Mappings from another Subset Schema for the same underlying Model Element, enables the central repository system to support Data (Transformational) Exchange between two Subset Schemas using one or more shared Model Elements, whereby the central repository system acts as the Transformational Hub of the exchange. The Central Repository System may prevent, or manage through restriction, incompatible Simplification Rules from being applied to a First Related Generated Subset Schema and a Second Related Generated Subset Schema, for example, based on a Defined Relationship Type (Independent-Dependent Content Integrity, Defined Overlap Integrity, Content Equivalent Integrity/Semantic Twin Content Integrity and Mutual Exclusiveness/Inverse Twin Content Integrity, etc.) between said First and Second Related Generated Subset Schemas.

The Transformational Mappings may be generated by preserving the underlying providence of the Generated Subset Schema's Data Objects to the Enterprise Model within the central repository system. The one or more Simplification Rules may eliminate, move, and/or replace one or more Data Objects from a Generated Subset Schema. The Central Repository System may unwind any Simplification Rule(s) applied to any Generated Subset Schema, as opposed to managing literal transformation mappings (including transformation logic) between data objects in various models and data objects in generated subset schemas or between data objects in a first subset schema to data objects in a second subset schema. The central repository system may use the Transformational Mappings to map Data Objects between a First Generated Subset Schema and a Second Generated Subset Schema, whereby either one, both or none of the First and Second Generated Subset Schemas may be Simplified. Additionally or alternatively, the central repository system may prevent (or manage thru restriction) incompatible Simplification Rules from being applied to the First Related Generated Subset Schema and the Second Related Generated Subset Schema based on a Defined Relationship Type between said First and Second Related Generated Subset Schemas. The central repository system may use the Transformational Mappings to govern Layout Simplification Compatibility for each Simplified Structured Enterprise Element across all (or a defined group of) Generated Subset Schemas. A "Simplified Structured Enterprise Element" is a Structured Enterprise Element where one or more Simplification rules have been applied to the Structured Enterprise Element (cardinality reduced, collapsed, etc.). The central repository system may use the Transformational Mappings to facilitate data exchange between a First Generated Subset Schema and a Second Generated Subset Schema, whereby either one, both or none of the First and Second Generated Subset Schemas are Simplified.

A Subset Schema layout may be customized to support a context for efficient consumption. In this regard, a Subset Schema may include the same Structured Element a plurality of times. That is, the Structured Element may be repeated throughout a Subset Schema. Each instance of the Structured Element may include a different set of Properties. The Structured Element may be assigned a Dynamic Complex Type, for example, when a First Repeating Structured Element has a different layout definition than a Second Repeating Structured Element within the same Subset Schema. In some embodiments, at least one repeating Structured Element has a Dynamic Complex Type assigned to it that differs from the underlying Complex Type assigned to a second Repeating Structured Element within the same Subset Schema. Each Structured Element that implements a Dynamic Complex Type within a Subset Schema may have a different (e.g., distinct) layout than other instances of the same underlying Structured Element within the Subset Schema.

A Subset Schema layout may be further customized to support a context for efficient storage/management. In this regard, a Structured Element (and its Dependent Element Tree) within a Subset Schema may be substituted with an Element Pointer, the Structured Element may be stored (e.g., managed) either in a second instance of the Structured Element within the same Subset Schema or alternatively, the Structured Element may be stored (e.g., managed) in an entirely different Subset Schema.

According to some aspects of the disclosure, the central repository system may manage a plurality of Role Names for an Element. The use of Role Names may enable the central repository system to support precise contextual implementation of Elements within Models, Subset Schemas, and/or Generated Subset Schemas. Role naming may be used to communicate meaning and/or contextualize usage of concepts. Role naming may be used in both the Model(s) and the Subset Schemas. Regardless of where the Role Names are being used, a Role Name may be defined within an Enterprise or Local Model and can be selected for consumption/inclusion within Subset Schemas. Enterprise Model elements can have many names. In this regard, each Enterprise Model element must have a preferred/enterprise name (may also be considered a role name type) and may have additional (contextual) role names, allowing the central repository system to track consumption of the underlying (role named) enterprise element and its implemented role name(s). Role names must be unique globally within the Central Repository System, such that their use facilitates semantic mapping.

In some examples, a Role Name may be assigned to a Structured or Simple Element in a Subset Schema. Role Naming in subset schemas may be used to narrow the meaning of the Structured or Simple Element. It commonly applies when the concept is defined generically in the Enterprise Model. For example, an Enterprise Model may have a Parent-Child, one-to-many relationship between a party and a license. The party could be a Customer, Agent, Employee, etc., and the license could be for driving, selling insurance, providing inspection services, etc. To support context specific qualified names in subset schemas, "driversLicense" and "insuranceLicense" may be added as role names to the license structured element in the Enterprise Model. In a customer centric subset schema, driversLicense would be used for the license node and in an Agency context insuranceLicense would be used.

Another example of narrowing the meaning in a subset schema may be to classify a collection (e.g., list) of entries into subgroups with specialized, narrower meanings. A specific sub-group may be referenced through its role name or by reference to multiple sub-groups through role named relationships. For example, Agreement Participants may be classified as Insureds, Drivers, Occupants, etc. Classifications may or may not be mutually exclusive.

Role naming can also be used to support qualifying names of simple elements when they have to be used outside of the parent's context, for example, when collapsing simplification results in the properties (simple elements) being moved between entities (structured data objects) in the model. These re-located simple elements may implement an element role name to provide the missing context or to avoid an element naming collision/conflict. A role name may indicate that the value set has a narrower meaning and/or better communicate the contextual meaning.

In the Enterprise Model, the use of role naming may be influenced by the modeling pattern used. For example, the use of generic concepts in models increases re-usability, but also requires role naming to qualify contextual usage. The use of context specific concepts in models may make the use of role naming unnecessary, but significantly reduces re-usability and enterprise visibility into like-data (including subset and overlapping data) being shared.

As an example, a party could have a "medicalProvider" role name that is used to reference medical providers in claim structures. In this example, the role name is used in the Enterprise Model to better communicate the context in which the party, a generic and linked concept, is used.

Another example of using role naming in the Enterprise Model is to bring the same relationship in multiple times and use role naming to qualify the context. For example, a party may have a one-to-many relationship to a vehicle, which can be commercially or privately owned. The vehicle can be role named as "privatePassingerVehicle" and "commercialVehicle" and the single party to vehicle relationship can be implemented as two, separate one-to-many relationships with party to "privatePassingerVehicle" and party to "commercialVehicle."

A single parent associative relationship may also be assigned a Role Name. For example, a single parent associative relationship, such as a party-to-party associative, may be assigned a Role Name to distinguish between two instances of the parent relationship. This is a required capability and should be implemented in the Enterprise model to support any subset schema layout that uses the single parent associative element as a starting node for a hierarchical data layout.

As noted above, narrowing the meaning of entities is a typical application of role naming in schema subsets. Model implementation of role naming is not intended to be contextual to a specific schema. The difference is that in the Enterprise Model, Role Naming is used to better communicate (e.g., describe) the meaning of the element and, in schema subsets, Role Naming may be used to narrow (e.g., restrict) the meaning defined in the model to the subset schema context.

Role naming should not be used to address unqualified names that are used to represent different concepts within multiple structures. For example, an element that is used to define policy status, billing status, and claim status may be an improper example of element re-use as the different implementations of status require different value sets.

Simple elements should be re-used within CIM model only is the meaning and the corresponding value set applies in full or partially across the uses. Role naming should not be used as a method to identify different value sets when a simple element is re-used.

A Sanctioned Element Name may be a type of Role Name, and an Element may have a single Sanctioned Element Name. A "Sanctioned Element Name" is the Enterprise Name (as opposed to a narrowed/contextual role name) of an Element within the Enterprise Model. The data governing body of the central repository system defines the Enterprise Name of an Element and the central repository system distinguishes this sanctioned name from any other names (role names) recorded for an element with the Enterprise Model. A Structured Element can be comprised of the same Simple Element a plurality of times, whereby each instance of the repeating Simple Element implements a different Role Name. The central repository system may track the implementation/consumption of an underlying Sanctioned/Enterprise Element Name across all associated Role Names used within Subset Schemas and Generated Subset Schemas, for example, via the internal Central Repository data object mappings.

In another aspect of the disclosure, the central repository system may record metadata describing the Data Objects in the central repository system. The central repository system may use the metadata to transform a Subset Schema into a Relational Data Model. A "Relational Data Model" is an industry standard term and may be represented in an Entity Relationship Diagram (ERD). The "diagram" may or may not be represented graphically. The scope and/or properties of ERDs may be user configurable to maximize communication, analysis, and/or design effectiveness. In a Relational Data Model, an entity (data container/table) has a bi-directional relationship with each related entity (data containers/tables). The metadata may comprise one or more of: structure type metadata for a Complex Type, object nature type metadata, relationship type metadata between a Complex Type and a Structured Element, and/or key type metadata for a Simple Element Member of a Structured Data Object. The structure type metadata may categorize a Complex Type as an Associative Entity/Structure, an Independent Entity/Structure, and/or a Dependent Entity/Structure. An "Associative Structure" is a Complex Type defining a data structure template that will be used by one or more Structured Element(s) to resolve a many-to-many data relationship between two (or more) other Structured Elements. An Associative Structure may be a data entity that resolves a many-to-many relationship between two other data entities (Structured Elements). An "Independent Structure" is a data entity that can exist alone. A "Dependent Structure" may be a data entity that cannot exist alone; the existence of an instance is "dependent" on having a related instance in another data entity (an "Associative Structure" is a special type of Dependent Structure because its resolving an underlying Many-to-Many relationship). A "Technical Structure" may be a Complex Type defining a data structure template that exists to support technical and processing needs only. The content of a Technical Structure is not considered core business data. Technical Structures may be exempt from various system requirements established for bi-directional relationship management, generating data models, etc. The object nature type metadata is operable to categorize a ComplexType as a "Business Structure" or "Technical Structure." The key type metadata may identify a Simple Element Member of a Structured Element as being a component of one or more of: primary key, business key, and/or an alternate key of the Structured Element. A "Primary Key" may be a specific choice of a minimal set of attributes that uniquely identifies an instance within an Entity. A "Business Key" is similar to a Primary Key in that the values of the attributes that comprise the Business Key are used by or referred to by the business to identify a unique instance within an entity; the Business Key, however, is solely comprised of attributes representing business data (includes no identifiers or artificially generated attributes). An "Alternate Key" is a group (of one or more) attributes/elements that meet the same criteria as a Primary Key and are, therefore, identified as an "Alternate Key." The relationship metadata may include "relationship optionality" and/or "relationship type." A Relationship's Optionality (for a Structured Element referenced by a Complex Type) as either "Mandatory" or "Optional." A Relationship's Type may describe a Relationship's Type (for a Structured Element referenced by a ComplexType) as at least one of: an Identifying Parent, Non-Identifying Parent, Identified Child, or Non-Identified Child.

Additional metadata may be managed by the Central Repository System, for example, to record business/data rules/relationships and objects along with enabling the generation of a Relational Data Model depicting a (simplified or not) Subset Schema. The additional metadata may be capable of recording/managing Supertype, Subtype Grouping and Subtype information. A "Supertype" may be comprised of, and own, a plurality of Subtype Groupings. Each Subtype Grouping may be comprised of a plurality of Subtype Grouping Members. A Subtype Grouping Member is a Subtype of the Supertype and is a Structured Data Object (ComplexType or Structured Element). Each Subtype Grouping may be categorized with "Subtype Grouping Type" metadata as having an "inclusive" or an "exclusive" relationship between its Subtype Grouping Members. "Structured Object Type" metadata may be operable to categorize a ComplexType as a "SuperType Entity," "Subtype Entity," and/or "Standard Entity." Relationship metadata may be configured to record a "Parent-to-Child relationship phrase" (i.e., a business rule) between a ComplexType and a Structured Element. Additionally or alternatively, relationship metadata may be operable to record a "Child-to-Parent relationship phrase" (i.e., a business rule) between a ComplexType and a Structured Element.

The described metadata may allow the central repository system to generate a Relational Data Model depicting the Simplified Layout Structure of a Generated Subset Schema. A User can choose to generate a Relational Data Model of the custom configured Simplified Layout Structure of the selected Subset Schema. Alternatively, the user may choose to generate the Relational Data Model in a Non-Simplified Enterprise Layout Structure of the selected Subset Schema. The User can choose to generate a Relational Data Model of the Simplified Layout Structure of the selected Subset Schema and/or a Non-Simplified Enterprise Layout Structure of the selected Subset Schema. The Central Repository is operable to record and manage internal metadata to enable a generated Relational Data Model to be capable of representing all or any combination of Independent Entities, Dependent Entities, Associative Entities, Supertype Entities, Subtype Entities, Subtype Groupings (owned by and of Supertype Entities), Subtype Grouping Type (Inclusive or Exclusive), Subtype Grouping Members (subtypes), bi-directional relationships between Entities, relationship cardinality and optionality of all relationships between Entities, parent-to-child and child-to-parent relationship phrases (business rules), Attributes (Non-Enumerated and Enumerated), Allowed Values Lists for Enumerated Attributes, Attribute Data Types, Primary Keys, Alternate Keys, Business Keys and Foreign Keys.

Additionally, aspects discussed herein may relate to methods and techniques for generating products (e.g., applications, executables, API(s)) using data objects and/or entities that comply with a canonical model. In particular, an application may receive an input requesting the creation of a new product. The input may comprise a definition of the new product. Additionally or alternatively, the input may comprise a data object and/or entity from the canonical model repository. In this regard, the data object and/or entity may be defined as the root node for the product. This allows the product to be built from any data object and/or entity in the canonical model, instead of a select number of traditional root nodes and their corresponding children nodes. Accordingly, the new product may comprise relevant data objects and/or entities and not the superfluous or extraneous data objects and/or entities that may be incorporated through the use of traditional hierarchical schemas. Once the root node is defined, one or more data objects and/or entities may be added to the product as child elements to the root node. Again, this allows the new product to be streamlined to include relevant data objects and/or entities and exclude the unnecessary data objects and/or entities. After the children elements have been added, one or more items associated with each of the children elements may be selected to be incorporated in the new product. Alternatively, one or more items may be removed (e.g., deleted) from the new product. Based on the one or more selected children elements and/or the one or more items, one or more simplification rules may be applied to the new product. The one or more simplification rules may collapse associative entities, reduce cardinality, and/or collapse one-to-one (1:1) relationships that exist in the product. This may flatten the new product in such a way that the new product consumes fewer processing resources while still complying with the canonical model. The flattened product may be exported in one or more data formats (e.g., Avro schema definition, XML Schema Definition (XSD), JSON Schema Definition, Java Class Definition, .Net Class Definition, Data Definition Language (DDL), etc.) and incorporated in another application or released as a standalone product.

One or more rules may be applied to the product to flatten the data structure of the product such that superfluous or extraneous code snippets may be removed, or reduced, in such a way that the product complies (remains transformable) with the canonical model. This improves the speed with which products are constructed, generated and executed, while ensuring that the products are able to communicate with other internal products.

FIG. 1A shows an example of a prior art point-to-point approach to data object transformation mapping. As shown in FIG. 1A, each system creates and/or manages custom (i.e., analyst driven) transformation mappings for its internal data structures to and/or from the internal data structures of each System it needs to interact (e.g., exchange/share data) with. Each system shown in FIG. 1A needs custom transformation mappings to and/or from every system that it interacts with, which typically results in tremendous resource allocation, change-management complexities, and significant software development delays. Moreover, errors related to synchronization and accuracy of related transformation mappings are extremely prevalent. This approach to data object transformation mapping is labor intensive, error prone, and costly. FIG. 1A does not have a standardized reference, such as a Canonical Model (CM) or Governed Model (GM). Accordingly, each system in FIG. 1A may have wildly incompatible data structures, resulting in extremely complex transformation logic/processes and constraints. Change-management is a very costly endeavor as each system needs to communicate impacting data structure changes to each of the systems interested in receiving/exchanging/consuming the system's data. When a system changes its data structures, all impacted Systems need to update their custom transformation mappings/logic/processes to stay current, and there is a strong timing and coordination element needed under this approach to cascade/implement changes.

Figure 1B:
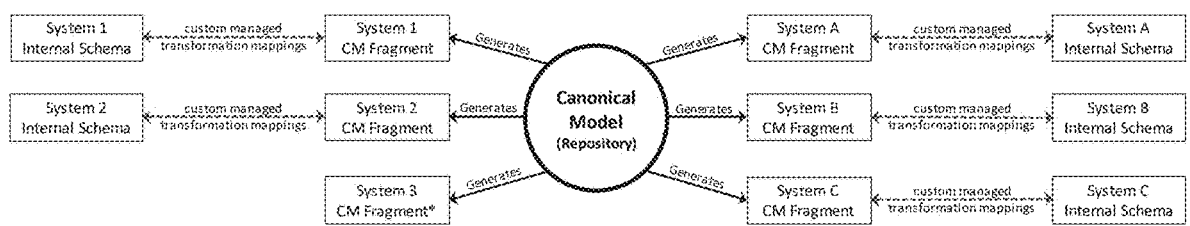
FIG. 1B shows an example of a prior art canonical model approach to data object transformation mapping.

FIG. 1B shows an example of a prior art canonical model approach to data object transformation mapping. As shown in FIG. 1B, the canonical model sources and/or generates the canonical model fragments needed for each participating system. Each participating system that implements an optimized/denormalized internal schema must create and/or manage custom, labor intensive, transformation mappings for its Internal Schema(s) to and/or from its (robust) canonical model fragment(s) of interest. In the approach shown in FIG. 1B, the canonical model does not facilitate the design and the direct generation and/or maintenance of a customized (e.g., optimized) internal schema(s) for each participating system. Systems may map their internal schemas to consumption inefficient, highly nested (e.g., sophisticated and robust) canonical model structures, which results in complex, labor intensive, and error prone transformation mappings. This creates an extreme barrier to adoption of the canonical model and usage of standardized data structures. These consumption inefficiencies can be measured in terms of cost, software development delays, complexity and/or performance delays. Each system using an optimized schema needs to have their custom transformation mappings to and/or from their canonical model fragment(s) maintained over time. Since each system can design their own optimized Internal Schema, they often do so in a semantically incompatible manner with the canonical model that causes constraints and/or re-work. As the canonical model changes data objects, all impacted systems need to continuously manage and/or update their canonical model transformation mappings/logic/process to stay current. This process often leads to complex management and tracking of the canonical model and/or Transformation Mapping versioning to support content, structure, and/or timing needs.

Figure 1C:
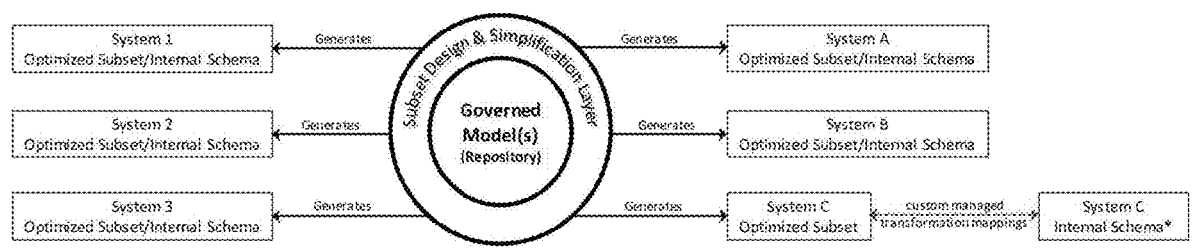
FIG. 1C shows an example of forward engineering of optimized subsets from a central repository approach to data object transformation.

FIG. 1C shows an example of forward engineering of optimized subsets from a central repository approach to data object transformation according to one or more aspects of the disclosure. As shown in FIG. 1C, the Central Repository System uses unified Governed Model(s) to facilitate the design of and the direct generation/maintenance of a customized/optimized internal schema(s) for each participating system. While performing these functions, the Central Repository System records and maintains all transformation mappings programmatically between the Governed Models and each participating System, which eliminates custom managed transformation mappings by analysts. The Central Repository System described herein also delivers schemas with custom selected data objects in a consumption-efficient/denormalized/optimized schema(s) as opposed to a highly-nested/robust/complex canonical model-type schema. The Central Repository System described herein facilitates the design and generation of an optimized, efficient data schema (as determined by the consuming System) for each participating/consuming System. Participating Systems do not create, manage, or maintain any transformation mappings to and/or from the Governed Models or the Central Repository System. Moreover, the Central Repository System described herein removes barriers to adoption by Systems by eliminating (or severely reducing) system development delays, costs, complexities, and performance degradation issues common to conventional (point-to-point and Canonical Model) approaches. Additionally, the Central Repository System generates all the transformation mappings (i.e., mappings and underlying optimization rules) for all participating Systems for data objects that are generated from, stored within, and/or maintained by the Central Repository System. Each internal schema generated from the Central Repository System is inherently aligned/compatible with the underlying unified Governed Model(s), ensuring common (e.g., compatible) data object structure, properties, terminology (e.g., vocabulary) and meaning, which creates higher data integrity, common understanding and/or meaning of data, and reduced development costs. The Central Repository System enables the brokering of data exchanges between any two participating Systems using internally generated and/or managed transformation mappings. Finally, the Central Repository System facilitates adoption by removing the burden from Systems to create and/or manage custom transformation mappings and by delivering (e.g., generating) consumption efficient schemas.

Figure 2:
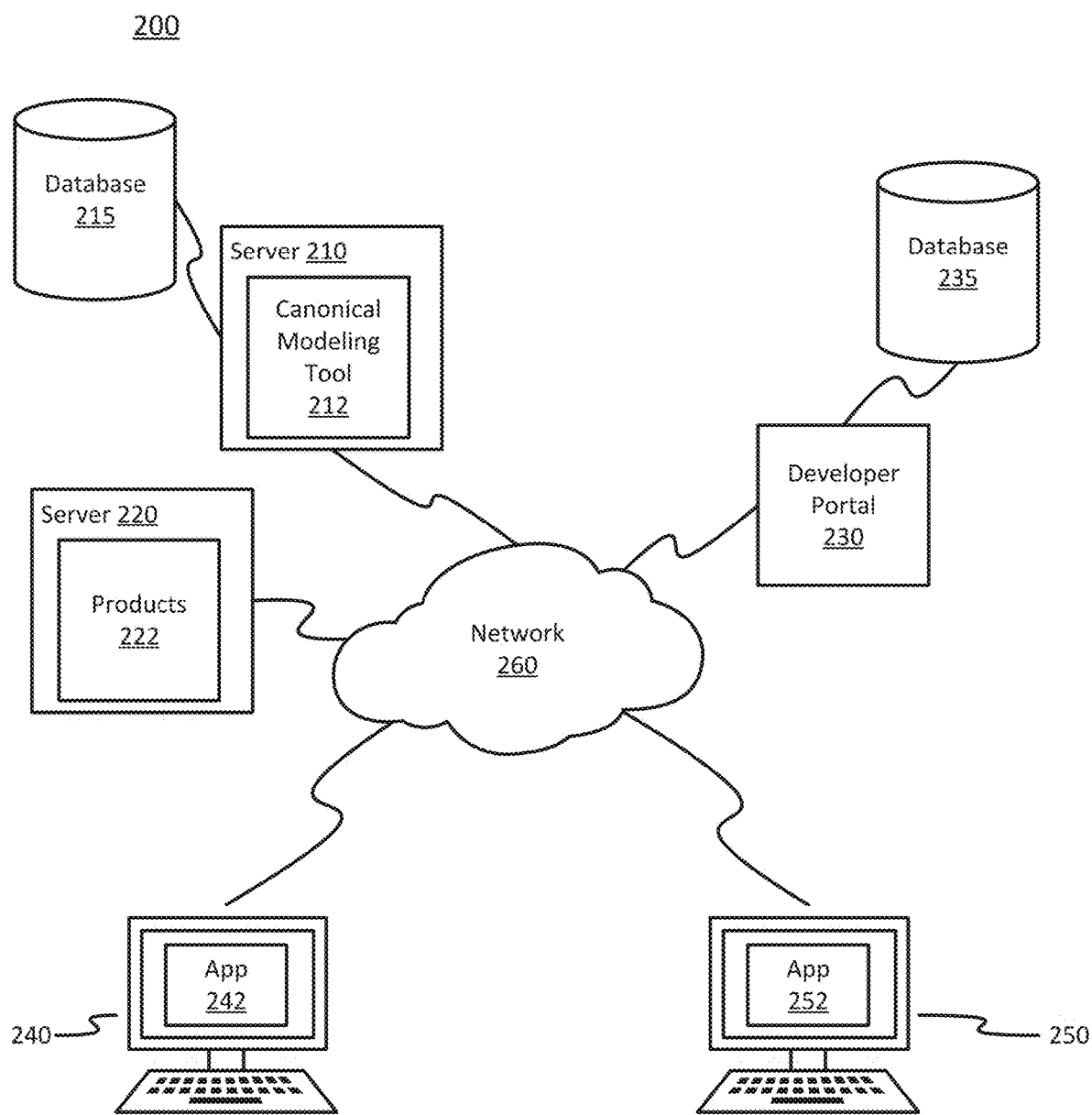
FIG. 2 shows an example of a system in which one or more aspects described herein may be implemented.

Turning to FIG. 2, a system 200 in which the canonical model may be deployed is shown. System 200 may include a first server 210, a second server 220, a developer portal 230, a first computing device 240, and a second computing device 250 interconnected via network 260. Additionally, first server 210 and developer portal 230 may be connected to a first database 215 and a second database 235, respectively.

First server 210 may be any computing device capable of performing the processes and algorithms described herein. First server 210 may be a standalone server, a corporate server, or a server located in a server farm or cloud-computing environment. According to some examples, first server 210 may be a virtual server hosted on hardware capable of supporting a plurality of virtual servers. First server 210 may comprise a server-side application, such as canonical modeling tool 212. Canonical modeling tool (CMT) 212 may provide a graphical user interface that allows a user (e.g., a developer) to build (e.g., compile) one or more products, applications, executables, APIs, etc. that comply (transformably compatible) with a standardized data format, for example, defined by one or more enterprise data policies and/or standards. Additionally or alternatively, the canonical modeling tool 212 may be used to generate one or more subset schemas. Each of the one or more subset schema may define different hierarchical views of the data objects contained in the canonical model. As used herein, "subset schema" may be used to indicate that the user can select what data objects to include in the schema, for example, both in terms of which entities and which attributes. In some examples, canonical modeling tool 212 may generate Avro schema definition, XML Schema Definition (XSD), JSON Schema Definition, Java Class Definition, .Net Class Definition, Data Definition Language (DDL), etc. schemas. As will be described in greater detail below, the user may select one or more objects and/or entities, via the canonical modeling tool 212, from a canonical model to build the one or more products, applications, executables, APIs, etc. The canonical model may be an entity-relationship model, a hierarchical model, or a variant thereof. The canonical model may provide an implementation agnostic view of data objects and/or entities. The data objects and/or entities may comprise attribute definitions and/or structure definitions with their relationships, as well as reusable type definitions. Attribute definitions may be reused across objects and/or entities to define relationships between objects and/or entities, including any related objects and/or entities as an attribute (or property in class terminology). Additionally, each of the data objects in the canonical model may also define its relationships with one or more of the other data objects. In some instances, each of the data objects may also comprise a reusable type definition. The canonical model may comprise metadata associated with each of the data objects and/or entities. The metadata may comprise at least one of: a structure type or associative annotation, a supertype name and relationship hierarchy annotation, a relationship type annotation, a relationship optionality annotation, an element key type annotation, a parent-child relationship verb annotation, a role name annotation, or a relationship type annotation. The canonical model may be represented via any suitable schema, including, for example, an XML schema, such as Garden of Eden XML Schema, XML Schema Definition ("XSD"), Document Type Definitions ("DTD"), Document Structure Description ("DSD"), Document Content Description ("DCD"), Constraint Language in XML ("CLIX"), or an equivalent thereof. Canonical modeling tool 212 may manage the canonical model. The canonical model may be managed in a relational database associated with the canonical modeling tool 212. In this regard, canonical modeling tool 212 may store the canonical model in a suitable memory location, such as first database 215.

First database 215 may be configured to maintain, store, retrieve, and/or update data and/or information for first server 210. As noted above, the data and/or information maintained by first database 215 may comprise the canonical model. Additionally or alternatively, the first database 215 may comprise the central repository system, described above, that comprises one or more models and/or a plurality of subset schemas. Further, first database 215 may provide the first server 210 with data and/or information periodically or upon request. In this regard, the first database 215 may comprise a distributed database capable of storing, maintaining, and/or updating large volumes of data across clusters of nodes. First database 215 may comprise a variety of databases including, but not limited to, relational databases, hierarchical databases, distributed databases, in-memory databases, flat file databases, XML databases, NoSQL databases, graph databases, and/or any combination thereof.

Second server 220, like first server 210, may be a standalone server, a corporate server, or a server located in a server farm or cloud-computing environment. According to some examples, first server 210 may be a virtual server hosted on hardware capable of supporting a plurality of virtual servers. Second server 220 may comprise one or more products 222. Products 222 may comprise one or more applications, executables, API interfaces, etc. generated and/or defined, for example, using canonical modeling tool 212. For instance, product 222 may be an application, generated by canonical modeling tool 212, configured to generate an insurance policy. Additionally or alternatively, the application may be configured to generate a rate quote. In some examples, product 222 may comprise an application that includes one or more APIs generated using canonical modeling tool 212. In this regard, the one or more APIs may use a standardized format to query databases based on information provided by a user and receive responses to those queries in the same standardized format. It will be appreciated that these examples are merely illustrative, and the canonical modeling tool 212 may be used to generate one or more products 222 that comply with the standardized data format defined by the canonical model.

Developer portal 230 may provide an interface for programmers and/or developers to create new subset schemas, new data objects, new data entities, new applications, new products, new APIs, and/or define, or update, the canonical model. Developer portal 230 may be configured to host development software Additionally, developer portal 230 may be a separate standalone server, corporate server, server located in a server farm or cloud-computing environment, and/or virtual server hosted on hardware capable of supporting a plurality of virtual servers. In some instances, developer portal 230 may be hosted by a third-party, such as GitHub®, SourceForge®, or the like. Developer portal 230 may be communicatively coupled to second database 235.

Second database 235 may be any suitable database, such as, a relational database, a hierarchical database, a distributed database, an in-memory database, a flat file database, a NoSQL database, a graph database, and/or any combination thereof. Second database 235 may be configured to maintain, store, retrieve, and/or update data and/or information related to subset schema. That is, one or more developers, or teams of developers, may define a subset schema that may be reused. Accordingly, the subset schema may be stored in second database 235. Additionally or alternatively, one or more developers, or teams of developers, may generate one or more data objects and/or entities. The one or more data objects and/or entities may be specific to the developers' work or a product that they developed. Additionally or alternatively, the one or more data objects and/or entities may not yet have been approved to be part of the canonical model. In this regard, the one or more data objects and/or entities may be stored in second database 235. In some examples, the one or more data objects and/or entities may be promoted from second database 235 to the canonical model stored in first database 215, for example, after being reviewed and/or approved by one or more administrators.

First computing device 240 may be any suitable computing device configured to perform the particular functions described herein. For example, first computing device 240 may be a mobile device, such as a cellular phone, a mobile phone, a smart phone, a tablet, or a laptop, and/or a personal computer, such as a terminal computing device, a desktop computing device, etc. First computing device 240 may provide a first user with access to a variety of applications and services. For example, first computing device 240 may provide the first user with access to the Internet. Additionally, first computing device 240 may provide the first user with one or more applications located thereon, including, for example application 242. The one or more applications may provide the first user with a plurality of tools and access to a variety of services. For instance, application 242 may be a web browser that provides the first user with access to the Internet. Alternatively, application 242 may be a web browser that interfaces and/or provides access to canonical modeling tool 212. In some instances, application 242 may be a client-side application developed using canonical modeling tool 212. In further examples, application 242 may be a web browser that interfaces and/or access a service-side application developed using canonical modeling tool 212. When application 242 is either a web browser that interfaces and/or provides access to canonical modeling tool 212 or a client-side application associated with canonical modeling tool 212, a user of first computing device may develop one or more products, applications, executables, application programming interfaces (API(s)), etc. using application 212. Additionally or alternatively, the one or more products, applications, executables, application programming interfaces (API(s)), etc. may be stored in a memory, such as first database 215 or second database 235. The one or more products, applications, executables, application programming interfaces (API(s)), etc. may be stored as a subset schema of the schema defined by the canonical model.

Second computing device 250 may be similar to the first computing device 240 discussed above. In this regard, the second computing device 250 may include any suitable computing device configured to allow a user to execute software for a variety of purposes as described herein. Second computing device 250 may belong to the first user that accesses first computing device 240, or, alternatively, second computing device 250 may belong to a second user, different from the first user. The software of second computing device 250 may include one or more web browsers that provide access to websites on the Internet. Additionally, or alternatively, second computing device 250 may include an application 252. In some embodiments, application 252 may be one of the applications discussed above with respect to application 242.

Network 260 may include any type of network. In this regard, network 260 may include the Internet, a local area network (LAN), a wide area network (WAN), a wireless telecommunications network, a corporate network, a distributed corporate network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, WiMAX and LTE, is presumed, and the various computing devices described herein may be configured to communicate using any of these network protocols or technologies. The data transferred to and from various computing devices in system 200 may include secure and sensitive data, such as confidential documents, customers' personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 200. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 200 in front of one or more computing devices such that any external devices may communicate directly with the specialized hardware.

Figure 3:
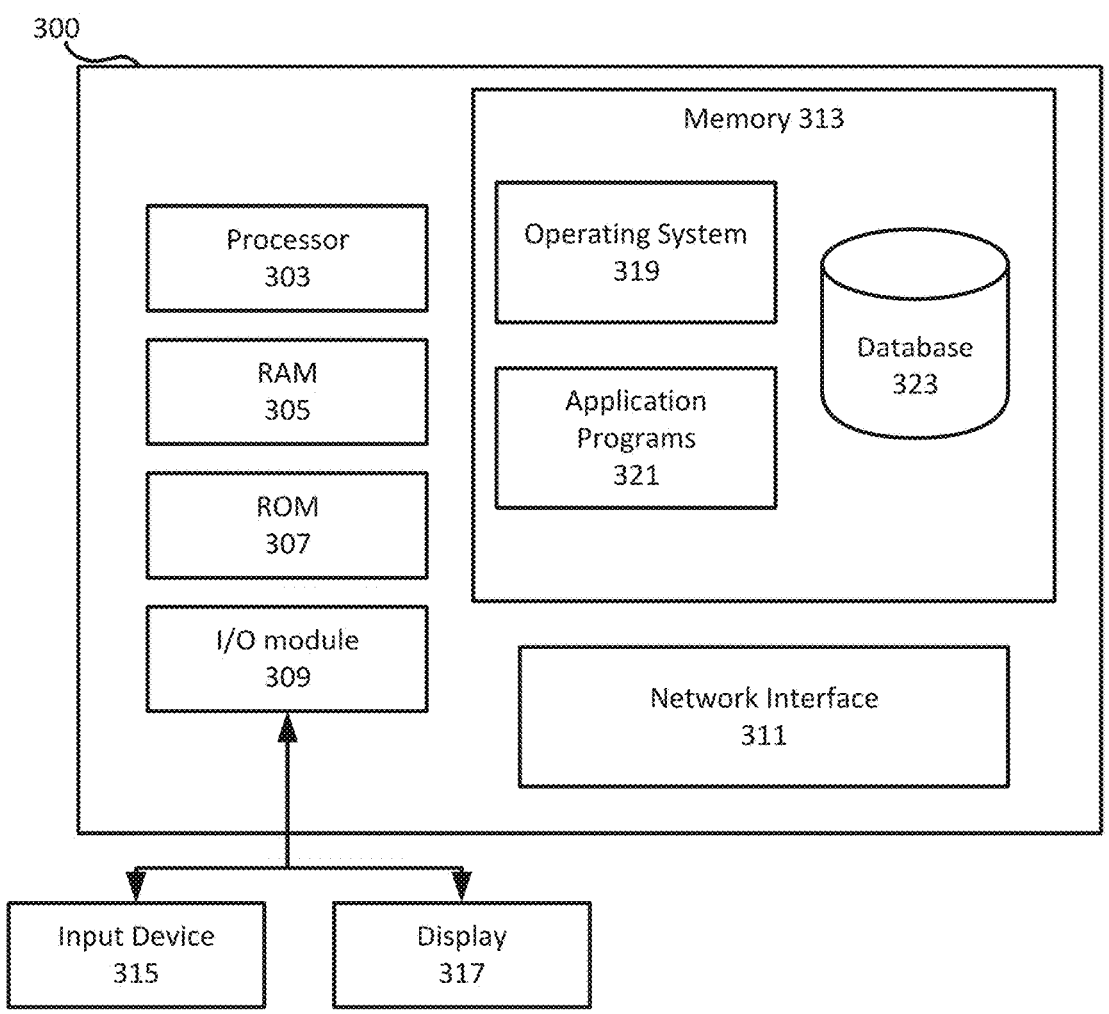
FIG. 3 shows an example of a computing device in accordance with one or more aspects described herein.

Any of the devices and systems described herein may be implemented, in whole or in part, using one or more computing systems described with respect to FIG. 3. FIG. 3 shows an example of a computing device 300. Computing device 300 may be similar to first computing device 240 and/or second computing device 250, discussed above. Additionally or alternatively, computing device 300 may be similar to first server 210 and/or second server 220.

Computing device 300 may include one or more processors 303. Processor 303 may include a single central processing unit (CPU), which may be a single-core or multi-core processor. Alternatively, processor 303 may include multiple CPUs or a plurality of multi-core processors. Processor(s) 303 and associated components may allow the computing device 300 to execute a series of computer-readable instructions to perform some or all of the methods, processes, and/or algorithms described herein. Processor(s) 303 may be capable of controlling operations of computing device 300 and its associated components, including RAM 305, ROM 307, an input/output (I/O) module 309, a network interface 311, and memory 313. For example, processor(s) 303 may be configured to read/write computer-executable instructions and other values from/to the RAM 305, ROM 307, and memory 313.

The I/O module 309 may be configured to be connected to an input device 315, such as a microphone, keypad, keyboard, touchscreen, and/or stylus through which a user of the computing device 300 may provide input data. The I/O module 309 may also be configured to be connected to a display device 317, such as a monitor, television, touchscreen, etc., and may include a graphics card. The display device 317 and input device 315 are shown as separate elements from computing device 300; however, they may be within the same structure.

The memory 313 may be a computer-readable medium for storing computer-executable instructions (e.g., software). The instructions stored within memory 313 may enable computing device 300 to perform various functions, including the methods, processes, and/or algorithms described herein. For example, memory 313 may store software used by computing device 300, such as an operating system 319 and application programs 321, and may include an associated database 323.

Although not shown in FIG. 3, various elements within memory 313 or other components in computing device 300, may include one or more caches, for example, CPU caches used by the processing unit 303, page caches used by the operating system 319, disk caches of a hard drive, and/or database caches used to cache content from database 323. For embodiments including a CPU cache, the CPU cache may be used by one or more processors in the processor 303 to reduce memory latency and access time. In such examples, the processor 303 may retrieve data from or write data to the CPU cache rather than reading/writing to memory 313, which may improve the speed of these operations. In some examples, a database cache may be created in which certain data from a central database such as, for example, a database associated with a server (e.g., first server 210, second server 220) (e.g., a claims database, an underwriting database, insurance customer database, local information database, etc.) is cached in a separate smaller database on an application server separate from the database server. For instance, in a multi-tiered application, a database cache on an application server can reduce data retrieval and data manipulation time by not needing to communicate over a network with a back-end database server such as, for example, one or more servers (e.g., first server 210, second server 220). These types of caches and others may be included in various embodiments, and may provide potential advantages in certain implementations of retrieving and analyzing field data and/or local data, such as faster response times and less dependence on network conditions.

The network interface 311 may allow computing device 300 to connect to, and communicate with, a network, such as network 260. As noted above, network 260 may be any type of network, including a local area network (LAN) and/or a wide area network (WAN), such as the Internet, a cellular network, or satellite network. Through the network 260, computing device 300 may communicate with one or more other computing devices, such as a server (e.g., first server 210, second server 220), to exchange insurance-related data and/or information. The network interface 311 may connect to the network (e.g., network 260) via communication lines, such as coaxial cable, fiber optic cable, etc., or wirelessly using a cellular backhaul or a wireless standard, such as IEEE 802.11, IEEE 802.15, IEEE 802.16, etc. Further, the network interface 311 may use various protocols, including TCP/IP, Ethernet, File Transfer Protocol (FTP), Hypertext Transfer Protocol (HTTP), etc., to communicate with other computing devices, servers, and the like.

Figure 4:
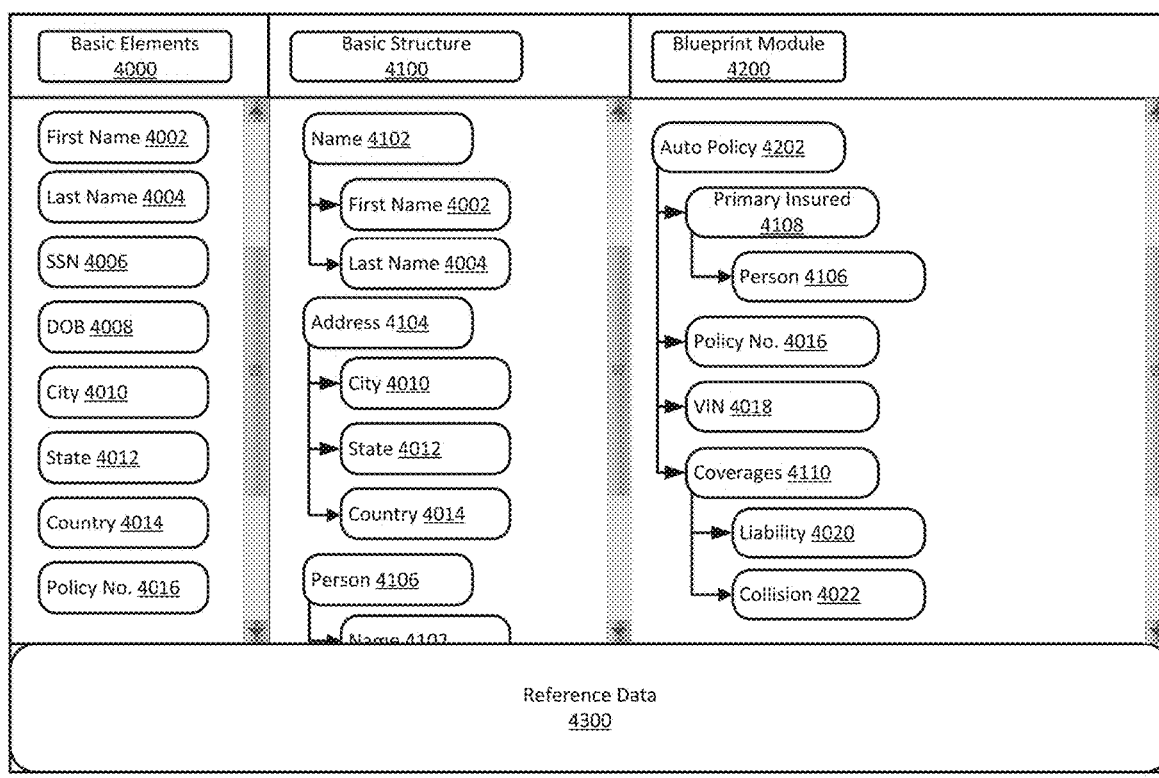
FIG. 4 shows an example of a canonical model according to one or more aspects of the disclosure.

As discussed above, an enterprise and/or corporation may create a canonical model to define a logical data structure that represents data entities (e.g., objects, classes, methods, libraries, etc.) and/or their relationships. FIG. 4 shows an example of a canonical model according to one aspect of the disclosure.

FIG. 4 illustrates a canonical model designed to represent data across an entire enterprise and/or corporation, and not simply limited to a traditional product offering, such as insurance products, or other products associated with the enterprise. As shown, the canonical model may categorize data and/or information into three categories: basic elements 4000, basic structure 4100, and blueprint module 4200. Additionally, the canonical model may include reference data 4300.

Basic elements 4000 may define a class property. The basic elements may define names, data types, and a variety of other features of each basic element. Each object in basic elements 4000 may include a location identifier (e.g., URI, URL, etc.). The location identifier may be used by more complex objects to refer to the basic elements that comprise the complex object. In addition to containing information related to a user, basic elements 4000 may include product information. For instance, basic elements 4000 may define limits for certain products. For instance, basic elements may define a minimum liability coverage requirement for a particular state. Similarly, basic elements may include collision coverage requirement of the particular state. As will be discussed in greater detail below, basic elements 4000 may refer to reference data 4300 for state-mandated elements.

Basic structure 4100 may represent a more complex object (e.g., class) than basic elements 4000. As illustrated basic structure 4100 includes name 4102, address 4104, and person 4106. Name 4102 may include the basic elements first name 4002 and last name 4004. Similarly, address 4104 may include the basic elements: city 4010, state 4012, and country 4014. The incorporation of the basic elements may be accomplished by referring to the objects via the object's location identifier. Like basic elements, basic structures may also include location identifiers to be incorporated into more complex objects. For example, person 4106 may vary from name 4102 and address 4104 in that person 4106 refers to other basic structures. For example, person 4106 may refer to name 4102 and other information, such as address 4104, SSN 4006, DOB 4008, and the like (not shown in FIG. 4). Incorporating objects into various data structures by reference and/or by using the location identifier allows for data to stay up-to-date. That is, incorporating basic elements and/or data structures by reference may provide a bi-directional flow of data and/or information between the data objects and/or entities. For instance, if the basic element first name 4002 is updated, the update may flow to any data structure that incorporates first name 4002, such as name 4102. Similarly, if first name 4002 is updated in name 4102, the update may be reflected in the basic element: first name 4002.

Blueprint module 4200 may define one or more product offerings. As shown, blueprint module 4200 may define a product: auto policy 4202. Auto policy 4202 may include basic structures, such as primary insured 4108 and coverages. Primary insured 4108 may include another basic structure: person 4106. Similarly, the basic coverages 4110 may comprise two basic elements: liability 4020 and collision 4022. In addition to basic structures, auto policy 4202 may incorporate a number of basic elements, such as policy number 4016, and vehicle identification number ("VIN") 4018. Like the basic structures above, auto policy 4202 may incorporate the basic structures and basic elements by linking to the objects. This linking may be done through the use of a location identifier associated with each object (e.g., basic element, basic structure). As discussed above, incorporating basic elements and/or data structures by reference may provide a bi-directional flow of data and/or information between the data objects and/or entities. Accordingly, any changes made to any of the data and/or information contained in auto policy 4202 may be pushed to the underlying basic elements, and vice versa.

Reference data 4300 may include a variety of data related to laws and regulations that may define the objects in the products offered by the enterprise and/or corporation. For example, individual states may define minimum coverage for liability insurance for automobile insurance policies. The state laws and regulations may be defined by a basic element, such as state of residence 4012. In this regard, one basic element may be used to define another basic element. For instance, the reference data 4300 may include sample data for one or more data objects. In the context of insurance products, the reference data 4300 may comprise sample data associated with minimum coverage requirements. Accordingly, when a data object is added (e.g., selected) to be part of a subset schema, one or more sample data sets may be displayed, for example, from the reference data 4300. This may allow the user to enter one or more values for the data object based on the one or more sample data sets. By including reference data, the enterprise and/or corporation may ensure that their product offerings comply with state and federal laws and regulations. Furthermore, incorporating reference data 4300 may propagate changes in laws and regulations to policies with de minimis user interaction. In this regard, the reference data may be linked to the data objects. Accordingly, when reference data is updated, the updates may be propagated to the data objects. Similarly, if data objects are updated, the updates may be propagated to the reference data 4300.

The canonical model may implement a plurality of rules to provide smoother integration of legacy and/or existing applications. For example, element names may be defined in plural forms. Additionally, abbreviations for class names may be prohibited. By implementing the canonical model and several of the rules discussed herein, enterprises and/or corporations may support both legacy and future use cases, as well as be flexible to span multiple industries, products, and/or assets. In this regard, the canonical model may be designed to support automatic schema generation in a variety of formats (e.g., Avro schema definition, XML Schema Definition (XSD), JSON Schema Definition, Java Class Definition, .Net Class Definition, Data Definition Language (DDL), etc.), output schema documentation (including glossary of terms for the subset, graphical representation of the model subset, and mapping documents), and support self-service schema extraction to enable implementation at scale. To provide this functionality and flexibility, the canonical model shown in FIG. 4 may allow for any node to be selected as a root node from which schemas may be generated, while keeping relationships between nodes intact. As mentioned above, these relationships may remain intact through the use of an identifier or location, such as a URI or a uniform resource locator ("URL"). The capability to implement any object as embedded or referenced may allow for the expansion of any implementation. For example, linking objects using the location identifiers described herein may allow for the data to be shared across applications. Additionally, implementing objects by reference or by embedding the objects ensures that the canonical model remains relatively flat (e.g., ≤4 levels), instead of hierarchical. By maintaining a relatively flat canonical model, the data contained therein may be accessed relatively quickly and without much difficulty. Furthermore, the relatively flat canonical model may support both data at rest and data in motion.

Figure 5:
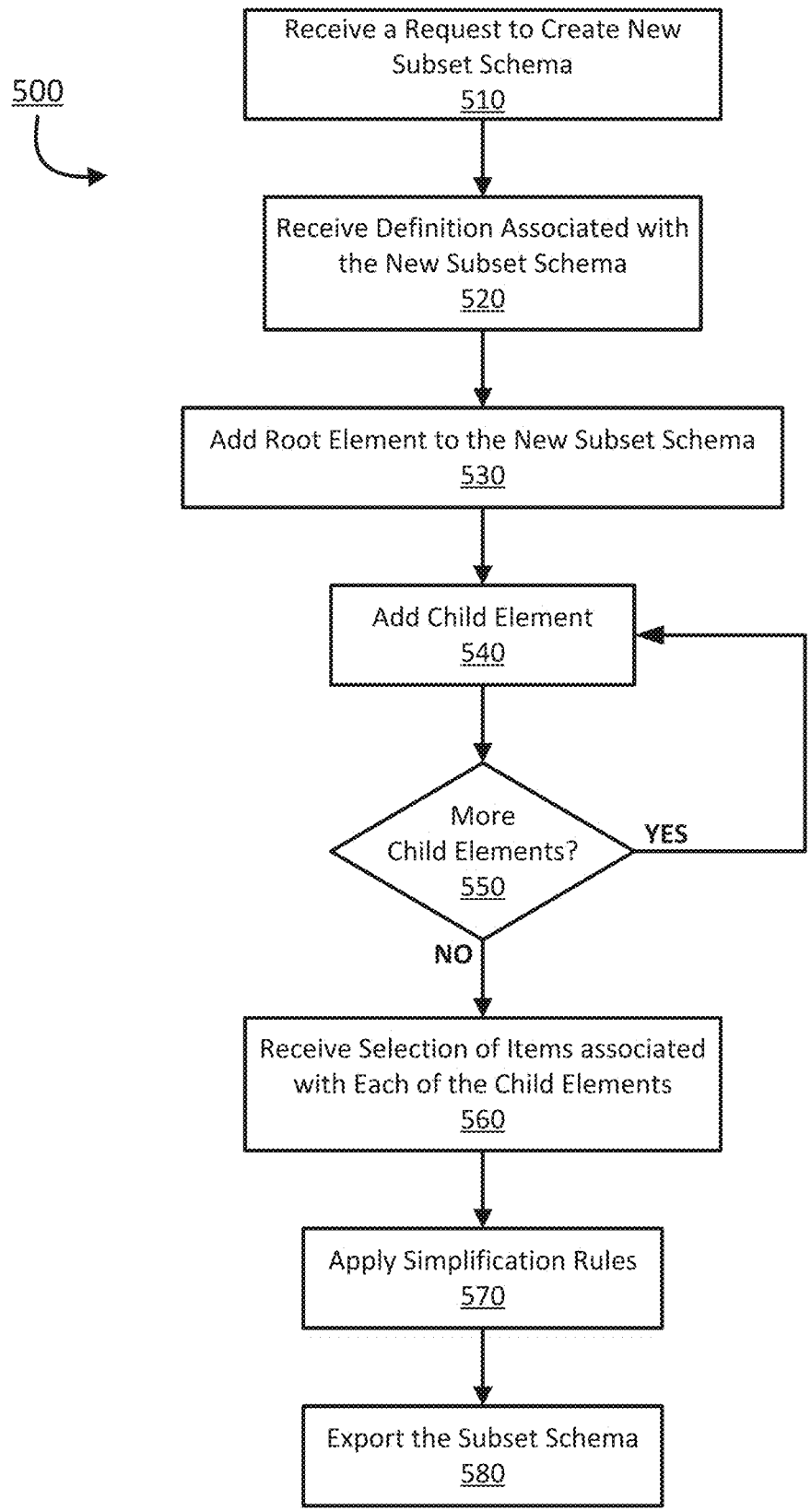
FIG. 5 shows an example of a method for generating a product in accordance with one or more aspects of the disclosure.

The canonical model may be used to generate one or more products, such as definitions of data structures that are used to build applications and/or application integrations. FIG. 5 shows a flow chart of a method 500 for generating a product in accordance with one or more aspects of the disclosure. Some or all of the steps of process 500 may be performed using one or more computing devices, including, for example, server 210, server 220, first computing device 240, second computing device 250, and/or computing device 300.

In step 510, a computing device (e.g., an application executing on the computing device) may receive a request to create a new subset schema. The new subset schema may be related to one or more products. As noted above, the one or more products may comprise an application, executable, or an API interface. For example, the applications and/or executables may comprise applications and/or executables that generate insurance products (e.g., auto insurance policy, homeowner's insurance policy, etc.). In another example, the applications and/or executables may comprise applications and/or executables that generate quotes, for example, based on data and/or information provided by a user. The API(s) may comprise API(s) that allow an application and/or executable to communicate with other components. For example, an API may communicate with one or more data stores (e.g., databases, repositories) to obtain data and/or information on behalf of an application and/or executable. In another example, an API may communicate with one or more applications and/or executables. Additionally or alternatively, the one or more products may be a data object and/or entity to be included in canonical model.

In step 520, the computing device may receive a definition for the new subset schema. The definition may comprise a collection associated with the new subset schema, a name for the new subset schema, a type definition for the new subset schema, and/or a description for the new subset schema. The collection may comprise an indication of the developer and/or the development team associated with the new subset schema. The name may comprise any alphanumeric combination used to identify the new subset schema. The name may comport with one or more naming standards defined by the canonical model. For example, the naming standards may define that the name has to be in upper camel case, the name has to be qualified, the name cannot be a generic type name, etc. The type of the subset schema may comprise different classifications of the data object and/or entity. For example, the type may comprise an element definition, a type definition, a group definition. The type of the subset schema may allow the subset schema to be reused and/or promoted to the canonical model. The description for the new subset schema may comprise an alphanumeric string that provides a human-readable definition of the subset schema. The description may provide information that describes the functionality and/or purpose of the subset schema.

After the new subset schema has been defined, the computing device may receive a selection of a root element for the new subset schema, in step 530. The root element may be a data object and/or entity from a central repository, such as the canonical model stored in the first database 215. As noted above, the root element may be any data object and/or entity contained in the canonical model. That is, the root element does not need to be a root node that includes one or more children nodes. For example, if the new subset schema is for generating an auto insurance policy, the root element may be any data object and/or entity associated with the auto insurance policy, instead of a root node element associated with an auto insurance policy that includes one or more child elements predefined in the auto insurance policy. In this way, the new subset schema can be built around any data object and/or entity. Further, the new subset schema may comprise data objects and/or entities relevant to the new subset schema and exclude data objects and/or entities that may be superfluous or extraneous.

In step 540, the computing device may add a child element. The addition of the child element to the new subset schema may comprise selecting one or more values for the child element and/or the data object. The addition of the child element may cause one or more sample values to be displayed. The Central Repository System may be configured to record (e.g., store) Sample Values for Data Objects and display/present these Sample Values to users viewing data objects within the Central Repository System's Model (s). The Central Repository System may record (e.g., store) and display Sample Value Streams (record instances) for a Subset Schema and generate sample data records compliant with a (simplified or not) Subset Schema in a consumable format/file. A plurality of Simple Elements within a Generated Subset Schema may be combined to describe a Single (record) Instance of the Generated Subset Schema within a Sample Value Stream. Each of the plurality of Simple Elements comprising the Single Instance (Sample Value Stream) of the Generated Subset Schema may have a Sample Value describing the Single Instance (record). As noted above, the one or more sample values may be obtained from reference data, such as reference data 4300 above. The Central Repository System may present (e.g., display) the Sample Values to Users viewing said Data Objects within the Models. The Central Repository System may be operable to present (e.g., display) the Sample Values to Users to facilitate enhanced understanding of a Data Object and enable efficient Selection of Data Objects within the Models for inclusion in a Subset Schema. In this regard, a user may define the value of the child element, for example, based on one or more of the displayed values. The child element may be another data object and/or entity selected from the central repository (e.g., the canonical model in the first database 215). Additionally or alternatively, the child element may be selected from a local repository, such as second database 235. As noted above, one or more developers, or teams of developers, may generate one or more data objects and/or entities, for example, specific to their work and/or a product that they developed. The one or more data objects and/or entities may be stored in the local repository because they have not yet been approved to be part of the canonical model. That is, data objects and/or entities may be stored in a local repository. In time, the data objects and/or entities may be reviewed by a development team to ensure compliance with the canonical model. Once approved, data objects and/or entities may be promoted from the local repository to the central repository. In step 550, the computing device may determine whether there are any additional child elements to be incorporated in the new subset schema. If there are additional child elements, the method 500 may return to step 540, where one or more child elements may be added to the new subset schema. However, if the computing device determines that there are no additional child elements in step 550, the method 500 proceeds to step 560.

In step 560, the computing device may receive a selection of one or more items associated with each of the child elements. One or more child elements may comprise one or more data items. For example, a new subset schema for an auto insurance policy may comprise a child element for a type of vehicle. The type of vehicle data object may comprise one or more items, such as the vehicle identification number (VIN), the type of engine, the type of car (e.g., sedan, coupe), images of the vehicle, etc. The application (e.g., GUI) may allow for selection of items to include (and, exclude) from the child element. This provides for more granular control of the data and/or information included in the new subset schema. Furthermore, the selection of individual items from the child elements allows for smaller, simpler products that comply with the canonical model. The smaller, simpler products may execute faster and consumer fewer processing resources, thereby improving the overall implementation of the canonical model.

In step 570, the computing device may application one or more simplification rules to the new subset schema. The subset schema simplifications may be modifications made to the hierarchical data layout of the new subset schema with the intent of hiding model concepts and/or relationships that are not relevant to the subset schema scope. The one or more simplification rules may be user selected, but rule-driven. That is, the user selections defined above may define the one or more simplification rules applied to the new subset schema. The application of the one or more simplification rules may result in simpler data layouts that do not represent all relationships defined in canonical model. The one or more simplification rules may be applied, for example, when the removed (e.g., diluted/restricted) relationships and/or concepts are not relevant. The one or more simplification rules may comprise collapsing associative entities, cardinality reduction, and/or collapsing of 1:1 relationships. The one or more simplification rules try to balance the desire for simple (e.g., typically flat) data structures with the need to support future requirements.

Associative entities may be used to resolve many-to-many relationships in relational data structures (e.g., the data objects and/or entities in the canonical model). That being said, the collapsing of associative entities may be used to show a part of a relationship when data is represented using a hierarchical record layout. For example, a data object and/or entity may a history of policies that have been applied to a particular vehicle. Another data object and/or entity may identify a plurality of vehicles that are covered by an auto insurance policy. Accordingly, a first vehicle may create a many-to-many relationship between the history of the policies related to the first vehicle and the plurality of vehicles covered in auto insurance policy that includes the first vehicle. When creating the new subset schema (e.g., the auto insurance policy), the first vehicle being insured in the past may be considered irrelevant (superfluous, extraneous). There may not be a need to include the structure that is used to resolve the many-to-many relationship between the history of the policies and the plurality of vehicles in the new subset schema. Collapsing the associative entity between the history of the policies and the plurality of vehicles might not replace the many-to-many relationship between the two datasets, but instead replace the many-to-many relationship with a one-to-many relationship in the context of the hierarchical data layout.

Collapsing associatives may be used where a user has selected properties/attributes within the targeted data object and/or entity. Additionally or alternatively, collapsing associated may be performed on selected items (e.g., nodes) related to the targeted data object and/or entity that are to be included in the desired schema layout. To be eligible for collapsing associates, two or more types (e.g. Complex Types) underlying the collection of all "identifying parent" relationships to the data object and/or entity may prevent the collapsing of a recursive associative. A recursive associative may be where one data object and/or entity uses two identifying relationships to create an associative. This may prevent the loss of granularity (e.g., context) of user selected properties in the collapsed data object and/or entity if more than two identifying parent elements exist. Recursive associatives and/or associatives with more than two parent elements may be collapsible, for example, via rolenaming conventions. In some examples, associatives may be collapsed by incorporating the items of a parent element in a downstream child element.

In an example of collapsing an associative element, a First Parent Element may have an Unbounded Relationship to a downstream Associative Element (from a hierarchical perspective) and a Second Parent Element positioned downstream from the Associative Element (from a hierarchical perspective) may also have an Unbounded Relationship to the Associative Element. To collapse the Associative Element, the Properties of the Associative Element may be moved to the Second Parent Element and the Unbounded Relationship from the First Parent Element to the Associative Element may be transformed into an Unbounded Relationship from the First Parent Element to the Second Parent Element. All remaining Relationships to the Associative Element may be moved to the Second Parent Element and the Associative Element is removed from the Generated Subset Schema. The Cardinality and Optionality of all moved relationships may remain unchanged from their Pre-Simplification State.

Cardinality reduction may be a simplification option that converts a list (array) into a property. When cardinality reduction is applied on a data object and/or entity in the subset schema, the data defined by the subset schema may be mapped to a data object and/or entity in the canonical model, but the data object and/or entity matching the canonical model may not be mapped to the new subset schema with reduced cardinality. In this regard, a list might not be mapped back to a single property. In other words, if a first system has the data defined as a list (e.g., cardinality of many or unbounded) and a second system has reduced the cardinality to one, the computing device may transform the data of the second system into the data of the first system. However, the data of the first system might not be transformed into the data of the second system without losing data. Cardinality reduction may be used in combination with collapsing one-to-one relationships to create flatter data layouts. That is, by making the data layout flatter, the data layout becomes simpler.

In an example of cardinality reduction, an Unbounded Relationship from the First Structured Element to the Second Structured Element may be converted into a Bounded Relationship from the First Structured Element to the Second Structured Element. In yet another example, the one or more Simplification Rules may collapse a Bounded Element within the Generated Subset Schema. In this regard, a First Structured Element may have a Bounded Relationship to a downstream Second Structured Element. The Properties of the Second Structured Element may be moved to the First Structured Element and the Bounded Relationship between the First Structured Element and the Second Structured Element may be removed. All remaining relationships to and from the Second Structured Element may be moved to the First Structured Element and the Second Structured Element is removed (e.g., deleted) from the generated subset schema. The Cardinality and Optionality of all moved relationships may remain unchanged from their Pre-Simplification State.

Collapsing one-to-one relationships may comprise consolidating an item (e.g., node) with a parent data object and/or entity. That is, one or more items of a child element may be merged and/or consolidated with a parent element. The child element may then be removed from the hierarchical layout of the new subset schema.

After the one or more simplification rules have been applied to the new subset schema, the computing device may export the new subset schema, in step 580. In this regard, the computing device may receive an indication that the new subset schema is complete. The computing device may cause one or more options to be displayed that allow for the selection of a format for the new subset schema. For example, the computing device may display the option to export the new subset schema in an Avro schema definition, XML Schema Definition (XSD), JSON Schema Definition, Java Class Definition, .Net Class Definition, Data Definition Language (DDL), or similar format. In response to receiving a selection of the one or more options, the computing device may generate the product in the selected format. That is, the computing device may compile a product, for example, based on a selection of the one or more formats. As noted above, the product may be an application or executable incorporated in another application or executable. Alternatively, the product may be a standalone application or executable.

Figure 6A:
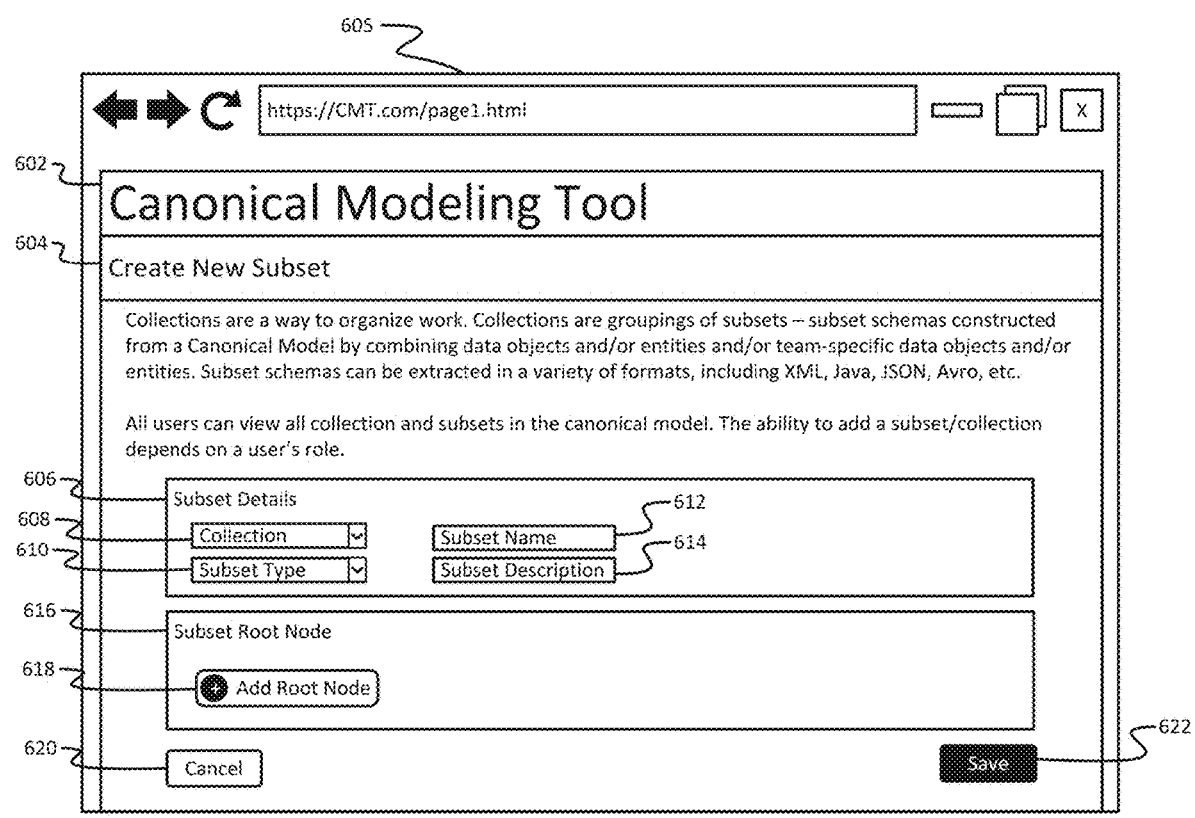
FIGS. 6A-6F show an example of a graphical user interface (GUI) for generating a product according to one or more aspects of the disclosure.

While the method 500 describes creating a new subset schema, it will be appreciated that a similar method could be used to modify an existing subset schema. In particular, at least steps 540, 550, 560, 570, and 580 could be performed to modify an existing subset Similar process for modifying subset schema FIGS. 6A-6F show an example of a graphical user interface (GUI) for generating a product according to one or more aspects of the disclosure. FIG. 6A shows a web browser 605. The web browser 605 may be displaying a canonical modeling tool 602, similar to the canonical modeling tool 212. While FIGS. 6A-6F show the canonical modeling tool being presented via a web browser, it will be appreciated that the canonical modeling tool 602 may be a standalone application that presents similar interfaces to those shown in FIGS. 6A-6F.

In FIG. 6A, the canonical modeling tool 602 may display a first interface 604. The first interface 604 may allow a user to create a new subset schema, for example, using the techniques described herein. The first interface 604 may comprise a subset details field 606, a subset root node field 616, a cancel button 620, and/or a save button 622.

The subset details field 606 may comprise a collection definition field 608, a subset type definition field 610, a subset name field 612, and/or a subset description field 614 As discussed above with respect to step 520, the collection definition field 608 may be a dropdown menu that allows a user to define the developer and/or the development team associated with the new subset schema. The subset type definition field 610 may comprise a dropdown menu configured to allow a user to select a classification of the new subset schema description field. The subset name field 612 may the user to enter an alphanumeric string of data to identify the new subset schema so the new subset schema can be identified later. The subset description field 614 may be configured to allow a user to enter a definition of the new subset schema.

The subset root node field 616 may comprise a button 618 that allows a user to add a data object and/or entity to the new subset schema. The button 618 may allow a user to add a data object and/or entity from a central repository as discussed in step 530, above. In this regard, any data object and/or entity may be selected from a central repository, such as data objects and/or entities that comply with the canonical model that are stored in the first database 215. The second interface 624, shown in FIG. 6B, shows an example of selecting a data object and/or entity as a root node.

Figure 6B:
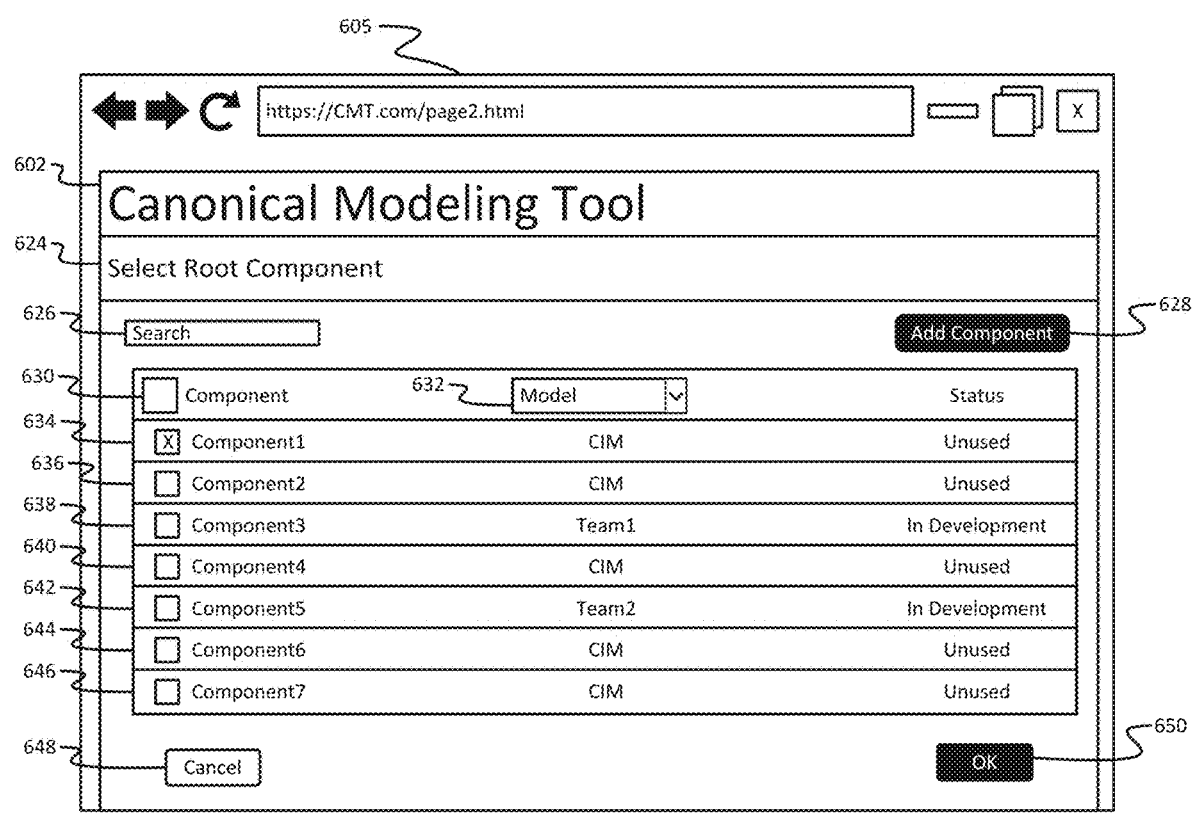

FIG. 6B shows a second interface 624. The second interface 624 may be configured to allow for selection of a data object and/or entity as the root node of the new subset schema. The second interface 624 may comprise a search field 626 and an add component button 628. The second interface 624 may also comprise a list of components, with a header field 630 and a plurality of data objects and/or entities (e.g., first component 634, second component 636, third component 638, fourth component 640, fifth component 642, sixth component 644, seventh component 646) displayed below the header field 630. The header field 630 may comprise a checkbox field that allows for selection (or de-selection) of all of the data objects and/or entities displayed in the second interface 624. The header field 630 may also comprise a dropdown menu 632 and a status field. The dropdown menu 632 may allow a user to choose which repository and/or model schema to select the root node data object and/or entity. For example, the dropdown menu 632 may allow the user to select the central repository, such as the one stored in first database 215, or a local repository, such as the one stored in second database 235. The status button may convey the status of the element. The status may indicate whether the component has been used in the subset schema or whether the element is still in development. The add component button 628 may allow the user to add one or more data objects and/or entities to the new subset schema. Once one or more data objects and/or entities have been selected for the root node, button 650 may be selected, and the canonical modeling tool 602 may proceed to a third interface 652, shown in FIG. 6C.

Figure 6C:
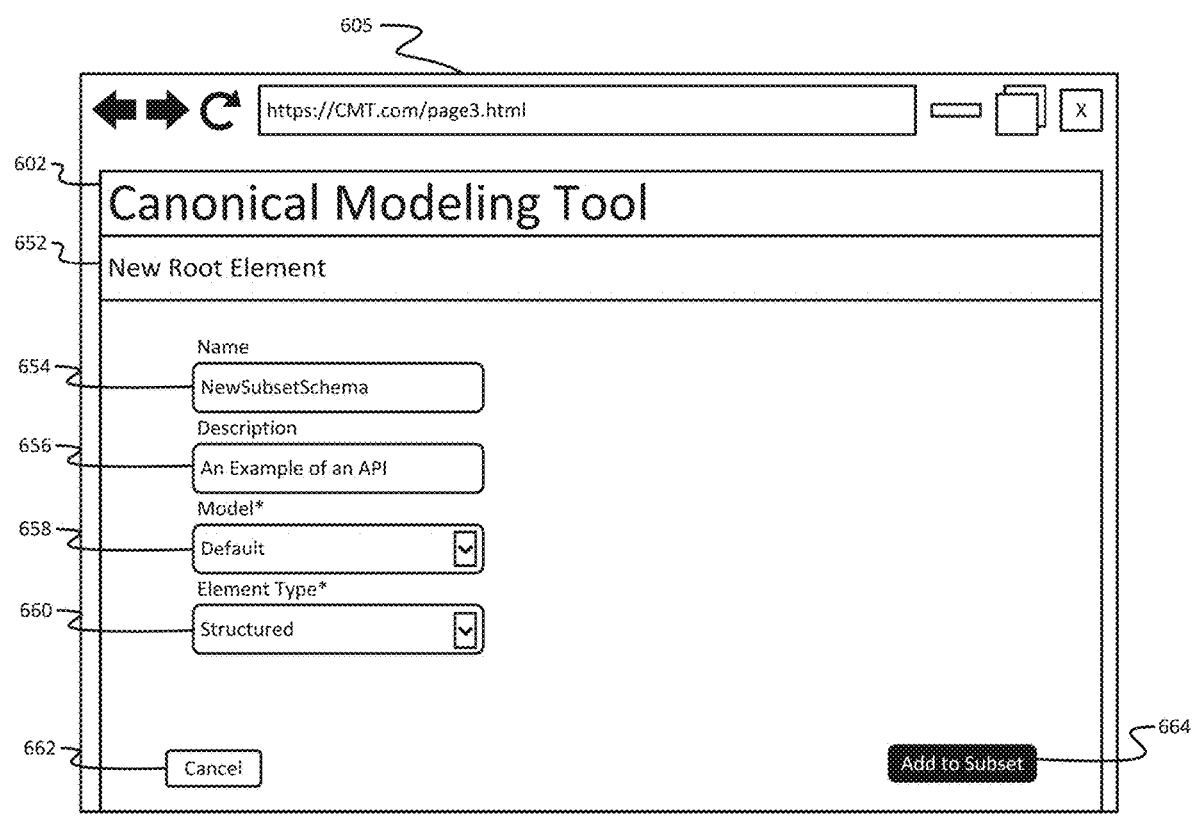

In FIG. 6C, the third interface 652 may be configured to allow a user to provide a definition for the new root element. The third interface 652 may comprise a name field 654, a description field 656, a model field 658, and/or an element type field 660. Much like the fields for creating the new subset schema, the name field 654 may be configured to define a name for the root element, the description field 656 may be configured to receive a description of the root element, the model field 658 may define the location of the root element, and the type field may define a type (e.g., structured, unstructured) for the root element. Once the information is defined, a button 664 may be selected to complete the addition of the root element to the new subset schema. Additionally, third interface 652 may return to first interface 604 after the root element has been added to the new subset schema.

At any point during the creation of the new subset schema or the addition of the root element, the user can cancel the creation of the new subset schema by clicking, for example, cancel button 620, cancel button 648, or cancel button 662. However, the save button 622 shown in FIG. 6A, if clicked, may create and/or save the new subset schema, including the root node. Additionally, the save button 622 may bring the user to a fourth interface 666, shown in FIG. 6D, where the user may add child elements to the new subset schema.

Figure 6D:
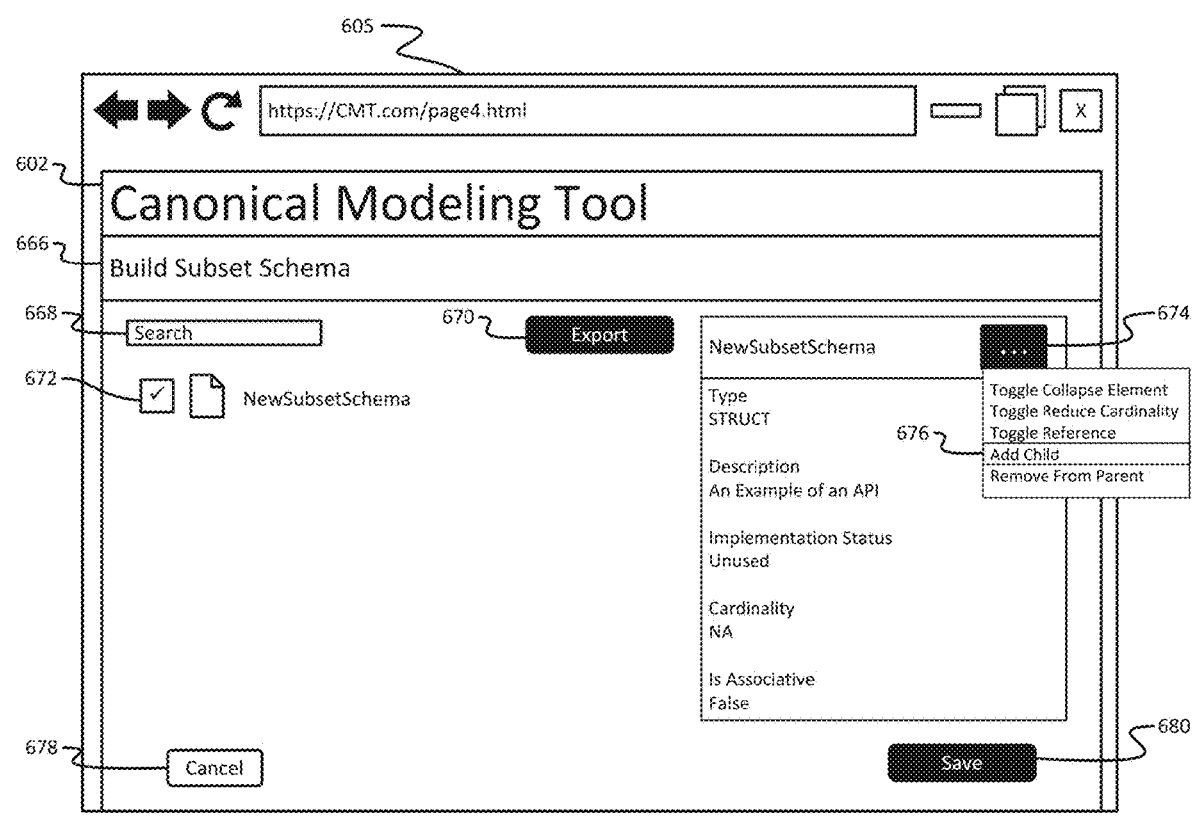

FIG. 6D shows an example of a fourth interface 666, which may allow a user to build the new subset schema. That is, the fourth interface 666 may allow a user to add one or more child elements to the root element. The fourth interface 666 may comprise a search field 668, an export button 670, a menu 674, a cancel button 678, and/or a save button 680. The fourth interface 666 may also show the new subset schema 672. The search field 668 may allow a user to search for child elements (e.g., data object and/or entities) to include in the new subset schema 672. Alternatively, users may select the menu 674. From the menu 674, the user may be presented with a plurality of options, including, for example, adding a child element 676. If the user searches via search field 668 or the add child option 676, one or more child elements may be added to the subset schema. In this regard, an interface, similar to interface 624, may be presented to allow the user to select and/or add child elements to the new subset schema. The export button 670 may export the new subset schema as a usable product (e.g., an application, executable, API, etc.), for example, when the new subset schema is completed. The cancel button 678 may stop any additions or changes made to the new subset schema without saving. The save button 680 may save any additions, changes, modifications, alterations, etc. made to the new subset schema 672.

Figure 6E:
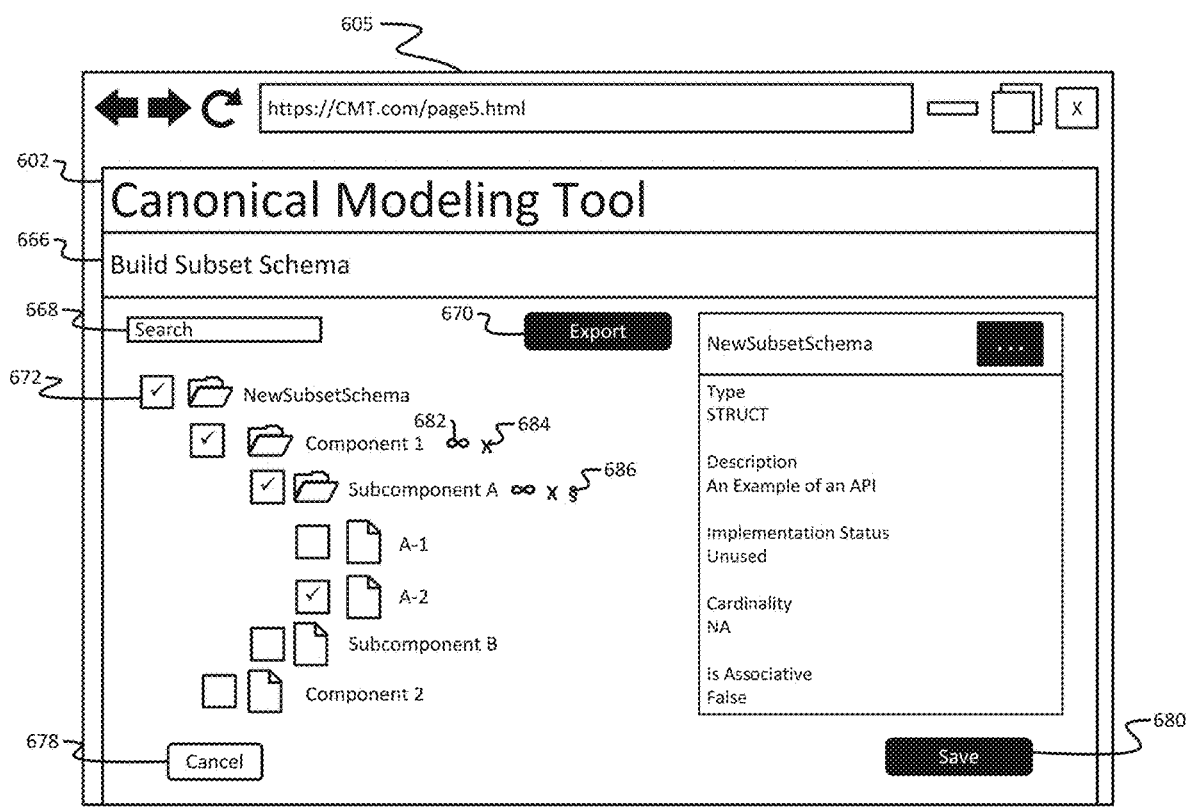

FIG. 6E shows fourth interface 666 after a plurality of child elements have been added to the new subset schema 672. As shown in FIG. 6E, component 1 and component 2 have been added to the subset schema 672. Component 1 comprises subcomponent A, which includes items A-1 and A-2. Also shown in FIG. 6E are the user-defined simplification rules. The user-defined simplification rules may be shown by first icon 682, second icon 684, and/or third icon 686. The first icon 682 may be used to collapse the relationship between the current element and the parent element. The second icon 684 may be used to remove components from the subset schema 672. Finally, the third icon 686 may be used to reduce cardinality between the components of the subset schema 672. These buttons may define one or more rules for simplifying the new subset schema 672. Once the new subset schema 672 and/or any associated simplification rules are defined, the export button 670 may be selected. If the export button 670 is selected, the canonical modeling tool 602 may display a fifth interface 688.

Figure 6F:
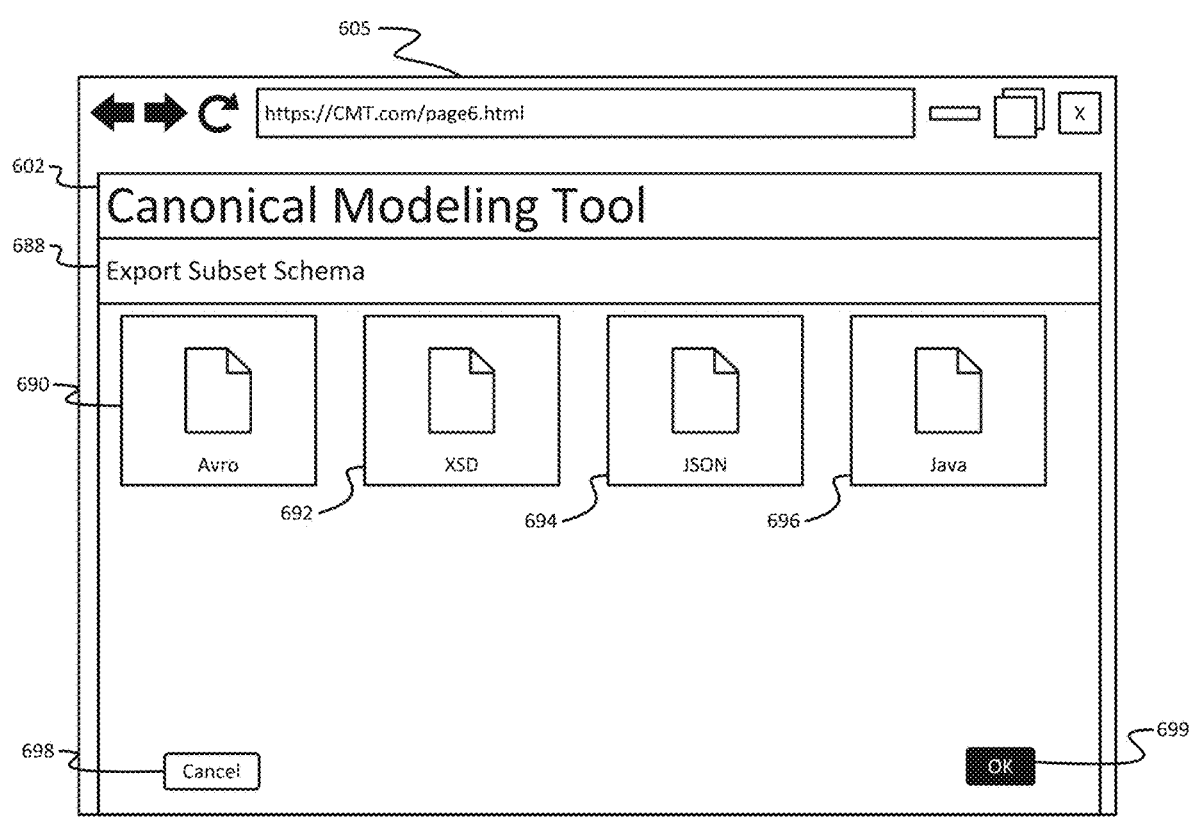

FIG. 6F shows an example of a fifth interface 688 for exporting the new subset schema as a product (e.g., application, executable, API, etc.). The fifth interface 688 may display one or more options for the format of the new subset schema. As shown in FIG. 6F, four format options are displayed: Avro format 690, XSD format 692, JSON format 694, and/or Java format 696. It will be appreciated that more, or fewer formats, may be shown than those depicted in FIG. 6E. Once one of the formats are selected, the canonical modeling tool 602 may generate executable code in the selected format, for example, based on a selection of the one or more format options.

Figure 7A:
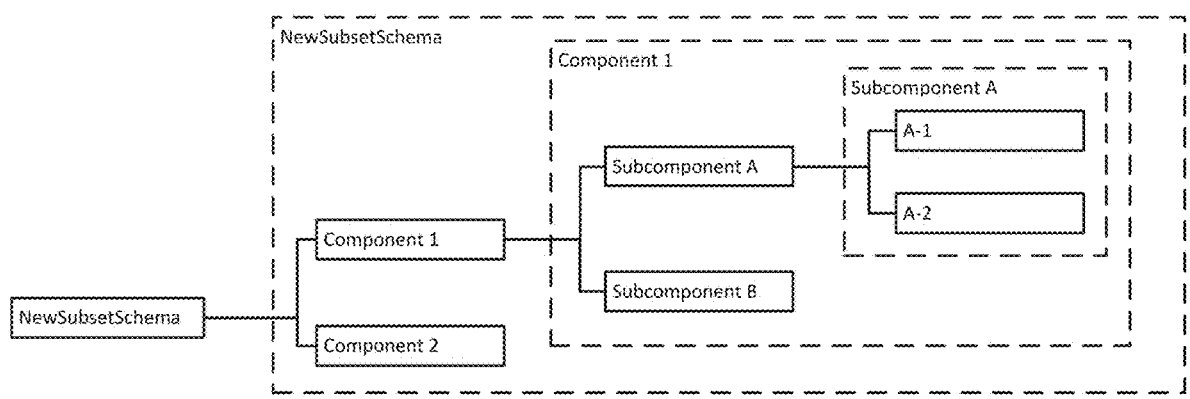
FIG. 7A-7B show an example of a hierarchical structure of a product in accordance with one or more aspects of the disclosure.
Figure 7B:
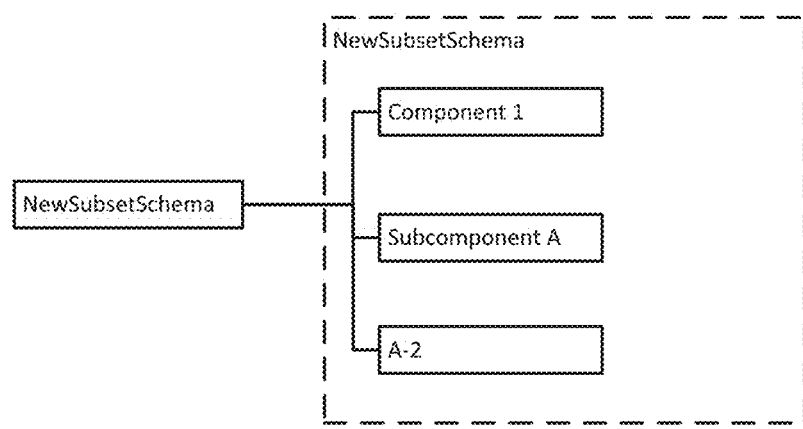

The subset schema may be depicted as a hierarchical structure showing the interrelationship between the various components and elements of the new product. FIGS. 7A and 7B show an example of a hierarchical structure of a product in accordance with one or more aspects of the disclosure. FIG. 7A shows an example of a hierarchical structure prior to any simplification rules being applied. In this regard, FIG. 7A shows the new subset schema depicted in FIG. 6E. The root node, "NewSubsetSchema," is shown with two branches corresponding to "Component 1" and "Component 2." Component 1 may have two branches, as well: "Subcomponent A" and "Subcomponent B." Finally, Subcomponent A is shown with two items "A-1" and "A-2." As shown in FIG. 7A, the new subset schema, and any products generated therefrom, may include items and data objects and/or entities that are not used in the new subset schema. In some examples, the computing device may cause the hierarchical structure shown in FIG. 7A to be displayed. Moreover, the new subset schema, before any of the simplification rules are applied, may have an extended tree structure. The combination of the unused items and data objects and/or entities may cause any product generated using the canonical modeling tool to run slowly due to the superfluous code snippets and extended nature of the code.

FIG. 7B, on the other hand, shows an example of a hierarchical depiction of the new subset schema after one or more of the simplification rules have been applied. As shown in FIG. 7B, the unnecessary items and data objects and/or entities have been removed from the code. Like FIG. 7A above, the computing device may cause the hierarchical structure shown in FIG. 7B to be displayed. Moreover, the new subset schema depicted in FIG. 7B has a flatter structure. Accordingly, any products generated from the new subset schema shown in FIG. 7B may consume fewer processing resources and execute more quickly, while still complying with the canonical modeling rules defined for the enterprise.

FIG. 8 shows an example of an illustrative model in accordance with one or more aspects of the disclosure. When visualizing the data content of a model, crow's foot notation may be used. Crow's foot diagrams represent entities as boxes, and relationships as lines between the boxes. Different shapes at the ends of these lines represent the relative cardinality of the relationship. As noted above, the canonical model described herein uses associative entities to resolve many-to-many relationships between core concepts (independent entities). Associative entities are often hidden (e.g., collapsed) in schemas that are generated from the canonical model to provide schema users with simpler context relevant data layouts. FIG. 8 shows an example of a model for an auto insurance policy. The model shown in FIG. 8 may be described using following statements: Vehicle Policy can have many policies, Vehicle may be defined by a Year Make Model combination and there are many vehicles that share the same Year Make Model combination; Vehicle may be related to many Vehicle Policies, Vehicle on a Vehicle Policy can have many coverages, and Coverages can have many limits and sub-coverages. Attribution may be defined for each of the entities (e.g., policyNbr in vehiclePolicy, etc.). As described herein, attribute definitions can be reused across entities and the relationships may be defined by including the related entity as an attribute (or property in class terminology).

As noted above, a model can be used to generate many subset schemas defining different hierarchical views of the data. The canonical modeling tool (a software interface of the Central Repository System) supports the generation of XML, JSON and Avro schemas. FIGS. 9A-9D shows an example of a JSON schema generated from the model shown in FIG. 8 in accordance with one or more aspects of the disclosure.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) Python, Perl, Lua, Node, etc. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although many example arrangements described herein are discussed in the context of insurance applications, aspects described herein may be used in different industries and for different applications or products without departing from the invention. Further, although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system comprising:
   a central repository system comprising a processor, a subset design and simplification layer configured to directly generate one or more generated subset schemas from one or more canonical models without creation of an intermediate respective canonical model fragment for each generated subset schema, and a memory communicatively coupled to the processor, wherein one or more computer-readable instructions are stored in the memory;
   the one or more canonical models managed by the central repository system,
      wherein the one or more canonical models comprise one or more structured elements, and
      wherein the one or more structured elements comprise one or more simple elements; and
   the one or more generated subset schemas, wherein the one or more generated subset schemas comprise one or more elements based on the one or more structured elements or the one or more simple elements from the one or more canonical models, wherein the one or more elements of the one or more generated subset schemas are forward engineered from at least one canonical model of the one or more canonical models;
   wherein the one or more computer-readable instructions are executable by the processor such that the central repository system is configured to design, record, and generate the one or more generated subset schemas by further applying one or more simplification rules of the simplification layer to a generated subset schema of the one or more generated subset schemas to generate a simplified generated subset schema as a new product flattened to comply with the at least one canonical model and consume fewer processing resources than when not flattened, the new product comprising one or more of applications, executables, or application programming interfaces as a customized new schema, wherein said forward engineering comprises generation of the new product by the one or more canonical models of the central repository system, wherein the generation of the new product comprises a direct design of the customized new schema through said forward engineering.

2. The system of claim 1, wherein the central repository system is configured to facilitate the design, the recording, and the generation of the one or more generated subset schemas by:
generating at least one of a collapse of an associative element, a reduction to cardinality of a relationship between two structured elements, a collapse of a 1:1 element, a collapse of a supertype element, a collapse of a subtype element, or a collapse of a repeating end branch element into an array.

3. The system of claim 1, wherein the central repository system is configured to said design, said record, and said generate the one or more generated subset schemas by managing content synchronization rules between selected subset schemas of the one or more generated subset schemas wherein the content synchronization rules perform at least two of:
govern content integrity between an independent subset schema and a dependent subset schema;
govern content integrity of two overlapping subset schemas;
govern content integrity between two content equivalent subset schema;
govern content integrity between two mutually exclusive subset schemas; and
enforce layout simplification compatibility between a plurality of the selected subset schemas.

4. The system of claim 1, wherein the central repository system being a design and sourcing system to said forward-engineer and generate the one or more generated subset schemas from the one or more canonical models enables the central repository system to create and store internal data object mappings and record simplifications applied to a subset schema wherein the central repository system is operable to programmatically generate data object mappings and data object transformation logic between data objects in the one or more generated subset schemas and their corresponding data objects in the one or more canonical models.

5. The system of claim 1, wherein the central repository system is configured to broker data exchange between any two generated subset schemas of the one or more generated subset schemas using the programmatically generated data object mappings and the data object transformation logic.

6. The system of claim 1, wherein the central repository system is configured to manage content of the one or more generated subset schemas wherein the managing the content comprises including data objects from an enterprise model in combination with data objects from one or more local models.

7. The system of claim 6, wherein the managing the content comprises sanctioning and promoting a data object from a local model to an enterprise model.

8. The system of claim 1, wherein the central repository system is configured to customize a customized subset schema layout wherein the customized subset schema layout may include a repeating structured element a plurality of times wherein each instance of the repeating structured element may be comprised of different simple elements.

9. The system of claim 8, wherein the customizing the customized subset schema layout comprises dynamic complex types to enable the inclusion of the repeating structured elements, wherein each repeating structured element in the customized subset schema layout can be comprised of different simple elements.

10. The system of claim 8, wherein the customized subset schema layout comprises a custom team element configured to group data objects from across any combination of one or more local models and an enterprise model.

11. The system of claim 8, wherein the customizing the customized subset schema layout comprises substituting a structured element with an element pointer.

12. The system of claim 1, wherein the central repository system is configured to manage a plurality of role names for an element wherein the plurality of role names promote contextual naming and usage of data objects and allow for tracking implementation of an underlying enterprise element while supporting precise contextual support.

13. The system of claim 12, wherein the plurality of role names enable a structured element to comprise a simple element a plurality of times.

14. The system of claim 1, wherein the central repository system is configured to manage enhanced metadata to enable the central repository system to generate a relational data model of a subset schema wherein the generated relational data model is operable to include at least eight of: independent entities, dependent entities, associative entities, supertype entities, subtype entities, subtype groupings, subtype grouping type, subtype grouping members, bi-directional relationships between entities, relationship cardinality of relationships between entities, relationship optionality of relationships between entities, parent-to-child relationship phrases, child-to-parent relationship phrases, attributes, attribute data types, primary keys, alternate keys, business keys, and foreign keys.

15. The system of claim 14, wherein the subset schema represented by the generated relational data model is a simplified subset schema forward engineered by the central repository system from the one or more canonical models.

16. The system of claim 1, wherein the central repository system is configured to manage data quality rules through a governship process wherein each element of an enterprise model is subject to at least two of: a governed state, a compliance state and a programmatically assigned element definition state.

17. The system of claim 16, wherein the data quality rules further manage a subset implementation state for each subset schema defined in the central repository system through production implementation rules wherein the subset implementation state of the subset schema is a variable to the programmatically assigned element definition state of each enterprise element the subset schema comprises.

18. The system of claim 16, wherein the data quality rules allow for the one or more generated subset schemas to contain enterprise compliant elements in combination with authorized enterprise non-compliant elements.

19. The system of claim 18, wherein the data quality rules support recording of replacement elements and resolution plans for non-compliant elements.

20. The system of claim 1, wherein the central repository system is configured to record sample values of data objects and display the sample values in a central repository interface to drive efficient object selection.

21. The system of claim 1, wherein the central repository system is configured to:

record sample value streams for the one or more generated subset schemas; and
generate sample data records compliant with the one or more generated subset schemas.

22. The system of claim 1, wherein the central repository system is configured to produce a generated subset schema of the one or more generated subset schemas in a plurality of executable formats wherein the plurality of executable formats comprise at least one of:
Avro Schema Definition;
JavaScript Object Notation (JSON) Schema Definition;
Java Class Definition;
XML Schema Definition (XSD);
.Net Class Definition; or
Data Definition Language.

23. A method comprising:
operating a central repository system comprising a subset design and simplification layer configured to directly generate one or more generated subset schemas from one or more canonical models without creation of an intermediate respective canonical model fragment for each generated subset schema, to manage the one or more canonical models;
applying, by the central repository system, one or more simplification rules of the simplification layer to a generated subset schema of the one or more generated subset schemas to generate a simplified generated subset schema, wherein the simplified generated subset schema comprises one or more elements of the one or more generated subset schemas that are forward engineered from at least one canonical model of the one or more canonical models managed by the central repository system; and
generating the simplified generated subset schema as a new product flattened to comply with the at least one canonical model and consume fewer processing resources than when not flattened, the new product comprising a customized new schema in one or more executable formats, wherein the new product comprises one or more of applications, executables, or application programming interfaces, wherein said forward engineering comprises generation of the new product by the one or more canonical models of the central repository system, wherein the generation of the new product comprises direct design of the customized new schema through said forward engineering.

24. The method of claim 23, wherein the one or more executable formats include at least one of:
Avro Schema Definition;
JavaScript Object Notation (JSON) Schema Definition;
Java Class Definition;
XML Schema Definition (XSD);
.Net Class Definition; or
Data Definition Language.

25. The method of claim 23 wherein the one or more simplification rules comprises at least two of:
collapsing an associative element;
reducing cardinality of a relationship between two structured elements;
collapsing a 1:1 element;
collapsing a supertype element;
collapsing a subtype element; or
collapsing a repeating end branch element into an array.

26. The method of claim 25, wherein the central repository system is configured to enforce layout simplification compatibility between a plurality of selected subset schemas of the one or more generated subset schemas.

27. The method of claim 23, wherein the central repository system is a design and sourcing system to said forward-engineer and generate the simplified generated subset schema enabling the central repository system to programmatically generate data object mappings and data object transformation logic between data objects in the simplified generated subset schema and their corresponding data objects in the one more canonical models.

28. The method of claim 27, wherein the central repository system is configured to broker data exchange between generated subset schemas of the one or more generated subset schemas by using the programmatically generated data object mappings and the data object transformation logic generated by the central repository system.

29. The method of claim 27, wherein the central repository system is configured to:
manage enhanced metadata; and
generate a relational data model of the simplified generated subset schema.

30. The method of claim 27, wherein the central repository system is configured to:
record sample value streams for the simplified generated subset schema; and
generate sample data records compliant with the simplified subset schema.

31. A method comprising:
directly designing, recording, and generating one or more generated subset schemas from one or more canonical models via a subset design and simplification layer of a central repository without creation of an intermediate respective canonical model fragment for each generated subset schema, to manage the one or more canonical models, wherein
the one or more canonical models are managed by the central repository system and comprise one or more structured elements, and wherein the one or more structured elements comprise one or more simple elements, and
the one or more generated subset schemas comprise one or more elements based on the structured elements or the one or more simple elements from the one or more canonical models;
forward engineering the one or more elements of the one or more generated subset schemas from at least one canonical model of the one or more canonical models;
further applying one or more simplification rules of the simplification layer to a generated subset schema of the one or more generated subset schemas to generate a simplified generated subset schema; and
generating the simplified generated subset schema as a new product flattened to comply with the at least one canonical model and consume fewer processing resources than when not flattened, the new product comprising a customized new schema in one or more executable formats, wherein the new product comprises one or more of applications, executables, or application programming interfaces, wherein said forward engineering comprises generation of the new product by the one or more canonical models of the central repository system, wherein the generation of the new product comprises direct design of the customized new schema through said forward engineering.

* * * * *